US012242522B2

(12) United States Patent
Gardner

(10) Patent No.: US 12,242,522 B2
(45) Date of Patent: Mar. 4, 2025

(54) CONFIDENCE ENHANCEMENT FOR RESPONSES BY DOCUMENT-BASED LARGE LANGUAGE MODELS

(71) Applicant: Microsoft Technology Licensing, LLC, Redmond, WA (US)

(72) Inventor: Matthew Jonathan Gardner, Irvine, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/311,973

(22) Filed: May 4, 2023

(65) Prior Publication Data

US 2024/0296279 A1 Sep. 5, 2024

Related U.S. Application Data

(60) Provisional application No. 63/450,069, filed on Mar. 5, 2023.

(51) Int. Cl.
  *G06F 16/332* (2019.01)
  *G06F 16/3329* (2025.01)
  (Continued)

(52) U.S. Cl.
  CPC ........ *G06F 16/3329* (2019.01); *G06F 16/338* (2019.01); *G06F 21/54* (2013.01);
  (Continued)

(58) Field of Classification Search
  CPC ..... G06F 40/169; G06F 40/134; G06F 40/279
  See application file for complete search history.

(56) References Cited

U.S. PATENT DOCUMENTS 8,719,005 B1  5/2014  Lee et al.
10,642,873 B2  5/2020  Blackford et al.
(Continued)

FOREIGN PATENT DOCUMENTS

EP         3698357 B1       4/2022
EP         4026121 A1       7/2022
WO   WO-2024073087 A1 *    4/2024

OTHER PUBLICATIONS

Greshake, et al., "More than you've asked for: A Comprehensive Analysis of Novel Prompt Injection Threats to Application-Integrated Large Language Models", In repository of arxiv code: 2302.12173v1 [cs.CR], Feb. 23, 2023, 12 Pages.
(Continued)

*Primary Examiner* — Asher D Kells

(57) ABSTRACT

Systems and methods are provided for implementing confidence enhancement for responses by document-based large language models ("LLMs") or other AI/ML systems. A first prompt is generated based on data items that are previously received or accessed. The first prompt is used by a first LLM or AI/ML system to extract requested information from the data items. One or more citations are generated and presented within a structured object together with a representation of the extracted information, in some cases, as output from a second LLM or AI/ML system. In some cases, the citations and/or the representation may be verified by a third LLM or AI/ML system, and reliability indicators may be generated for the citations and/or the representation based on determined accuracy of the citations and/or the representation. In this manner, the common issue of hallucinations may be mitigated.

20 Claims, 13 Drawing Sheets

(51) Int. Cl.
| | |
|---|---|
| *G06F 16/338* | (2019.01) |
| *G06F 21/54* | (2013.01) |
| *G06F 21/62* | (2013.01) |
| *G06F 40/134* | (2020.01) |
| *G06F 40/169* | (2020.01) |
| *G06F 40/279* | (2020.01) |
| *G06N 20/00* | (2019.01) |
| *G10L 15/22* | (2006.01) |

(52) U.S. Cl.
CPC ........ *G06F 21/6218* (2013.01); *G06F 40/169* (2020.01); *G06F 40/279* (2020.01); *G06N 20/00* (2019.01); *G10L 15/22* (2013.01); *G06F 40/134* (2020.01); *G06F 2221/032* (2013.01); *G06F 2221/033* (2013.01)

(56) References Cited

U.S. PATENT DOCUMENTS

| | | | | |
|---|---|---|---|---|
| 10,671,810 | B2 * | 6/2020 | Koutrika | G06F 40/289 |
| 11,182,562 | B2 | 11/2021 | Lee et al. | |
| 11,238,241 | B1 | 2/2022 | Mallikarjuniah et al. | |
| 11,368,840 | B2 | 6/2022 | Mai | |
| 11,373,093 | B2 | 6/2022 | Gu et al. | |
| 11,379,666 | B2 | 7/2022 | Qi et al. | |
| 11,610,586 | B2 | 3/2023 | Qiu et al. | |
| 11,620,441 | B1 * | 4/2023 | Schafer | G06F 40/30 715/271 |
| 2011/0264658 | A1 | 10/2011 | Wen et al. | |
| 2017/0337181 | A1 | 11/2017 | Belov et al. | |
| 2018/0329993 | A1 | 11/2018 | Bedadala | |
| 2019/0278771 | A1 | 9/2019 | Bozkaya et al. | |
| 2020/0020058 | A1 * | 1/2020 | Stauffer | G06F 16/345 |
| 2020/0065873 | A1 | 2/2020 | Ruvini | |
| 2020/0073871 | A1 | 3/2020 | Drivflaadt et al. | |
| 2020/0380077 | A1 | 12/2020 | Ge et al. | |
| 2021/0026897 | A1 | 1/2021 | Rathje et al. | |
| 2021/0192397 | A1 | 6/2021 | Rastogi | |
| 2021/0201901 | A1 | 7/2021 | Cheng | |
| 2021/0264268 | A1 | 8/2021 | Goswami et al. | |
| 2021/0398521 | A1 | 12/2021 | Hwang et al. | |
| 2022/0147898 | A1 | 5/2022 | Gaurav | |
| 2022/0413874 | A1 | 12/2022 | Awadallah et al. | |
| 2023/0050484 | A1 | 2/2023 | Parmar et al. | |
| 2023/0074406 | A1 | 3/2023 | Baeuml et al. | |
| 2024/0126795 | A1 | 4/2024 | Zhong | |
| 2024/0296177 | A1 | 9/2024 | Gardner | |
| 2024/0296219 | A1 | 9/2024 | Gardner | |

OTHER PUBLICATIONS

Maestro, Rafael Tappe, "The Rise of Large Language Models ~ Part 2: Model Attacks, Exploits, and Vulnerabilities", Retrieved from: https://blogs.itemis.com/en/model-attacks-exploits-and-vulnerabilities, Feb. 14, 2023, 5 Pages.

Ross, et al., "The Programmer's Assistant: Conversational Interaction with a Large Language Model for Software Development", In repository of arxiv code: 2302.07080v1 [cs.HC], Feb. 14, 2023, 43 Pages.

Singhal et al., "Large Language Models Encode Clinical Knowledge", In repository of arxiv code: 2212.13138v1 [cs.CL], Dec. 26, 2022, 44 Pages.

"LangChain Chat", Retrieved from the URL: https://web.archive.org/web/20230202004623/https://blog.langchain.dev/langchainchat/, Feb. 2, 2023, 11 Pages.

Cao, et al., "Systematic Rectification of Language Models via Dead-end Analysis", In Repository of arXiv:2302.14003v1, Feb. 27, 2023, 21 Pages.

International Search Report and Written Opinion received for PCT Application No. PCT/US2024/017937, Jun. 5, 2024, 15 pages.

International Search Report and Written Opinion received for PCT Application No. PCT/US2024/017938, Jun. 11, 2024, 16 pages.

International Search Report and Written Opinion received for PCT Application No. PCT/US2024/017939, Jun. 11, 2024, 15 pages.

Madaan, et al., "MemPrompt: Memory-assisted Prompt Editing with User Feedback," In Repository of arXiv:2201.06009v7, Feb. 18, 2023, 30 pages.

Non-Final Office Action mailed on May 20, 2024, in U.S. Appl. No. 18/311,963, 34 pages.

Si, et al., "Prompting GPT-3 To Be Reliable", In Repository of arXiv:2210.09150v2, Feb. 15, 2023, 24 Pages.

Zhuo, et al., "Exploring AI Ethics of ChatGPT: A Diagnostic Analysis", In Repository of arXiv.2301.12867v3, Feb. 22, 2023, 17 Pages.

* cited by examiner

When did Mona say that planning starts for the Summit Center project and what is the timeline mentioned in the 2023 Project Planning Document?

*February 10, 2023, 1:00 PM*

Mona said that Summit Center project is set to start pre-construction planning and site preparation for the new arena in Atlanta April 2023. * The project is set to go into the following year.

Summit Center Estimated Timeline: *
- April-June: Pre-construction planning and site preparation
- July-September: Construction begins
- October-December: structural work
- January - April (Next Year): Completions of finishes and fixtures
- May - August (Next Year): Commissioning and testing of systems, final site work, and obtaining final approvals for the arena.

[ Copy ]  [ ⊙ Edit in Loop  ⌄ ]

References **

2023 Project Planning
-- Summit Center is set to start pre-construction planning and site preparation for the new arena in Atlanta April 2023...*

2023 Project Planning

* Suggested contents may be incomplete or factually incorrect.

Fig. 3B

CONFIDENCE ENHANCEMENT FOR RESPONSES BY DOCUMENT-BASED LARGE LANGUAGE MODELS

CROSS-REFERENCES TO RELATED APPLICATIONS

This application claims priority to U.S. Patent Application Ser. No. 63/450,069 (the "'069 Application"), filed Mar. 5, 2023, by Matthew Jonathan Gardner et al., entitled, "Conversational Large Language Model-Based User Tenant Orchestration," the disclosure of which is incorporated herein by reference in its entirety for all purposes.

BACKGROUND

As information sources continue to vastly increase in size and scope, searching for and accessing information from user-specific data items stored in such information sources becomes increasingly cumbersome and ineffective, particularly in multitenancy contexts in which an instance of software runs on a computing system and serves multiple tenants who share access to the software instance without having access to other tenants' data. Artificial intelligence ("AI") and/or machine learning ("ML") tools that may be used in assisting in data item search and access bring challenges and issues of their own. It is with respect to this general technical environment to which aspects of the present disclosure are directed.

SUMMARY

This summary is provided to introduce a selection of concepts in a simplified form that are further described below in the detailed description section. This summary is not intended to identify key features or essential features of the claimed subject matter, nor is it intended as an aid in determining the scope of the claimed subject matter.

The currently disclosed technology, among other things, provides for an AI/ML system that performs at least one of conversational large-language-model ("LLM")-based user tenant orchestration, confidence enhancement for responses by document-based LLMs, and/or adverse or malicious input mitigation for LLMs. An example system includes an orchestrator or other computing system coordinating interactions among a user interface system or natural language interface system, one or more LLMs or LLM-based systems, information access devices, and/or data storage systems. Such interactions may include using function calls, using application programming interface ("API") calls, generating prompts, and/or generating responses. The AI/ML models are generative models that may be LLMs. While the discussion provided herein primarily refers to LLMs, other generative AI/ML models may be used in some examples.

To conduct the conversational LLM-based user tenant orchestration described herein, an orchestrator interacts with a natural language interface that is used to receive natural language ("NL") requests from a user, one or more LLMs, and a data storage system via an information access device. For example, in response to the NL request from the user, the orchestrator provides a first prompt to a first LLM that causes the first LLM to generate one or more queries for data items that would be responsive or relevant to the NL request from the user. The queries may then be executed to access or retrieve data items stored in a user-accessible portion of the data storage system. Based on the data items that are returned in response to the queries, a second prompt may be generated that causes a second LLM to return a program (e.g., a set of functions) that is then executed to generate a responsive result to the NL request of the user. The set of functions may be executed with the content of the data items and through the use of additional prompts or calls to one or more LLMs. In this manner, conversational LLM-based user tenant orchestration allows ease of search or access from the perspective of the user, as the user need only utilize NL requests. The orchestrator and the LLMs interact via prompts and outputs to generate NL responses that are in a useful form while handling the backend processing in both an efficient and high-performance manner that produces highly accurate and customized results that are specific to the user.

Hallucination is a term for when an AI function produces output that purports to be obtained from a particular source (e.g., the information access device) or produces the prompt itself, but portions of the output are not actually present in the particular source. Hallucination is a known issue with LLMs. To enhance confidence for responses by document-based LLM systems as described herein, when an LLM is prompted to extract information from the information access device or a data storage system, the LLM executes an AI function to output a structured object. The structured object displays or presents citations, and in some cases quoted text, for requested information extracted from data items stored in the data storage system. In some cases, another LLM may be used to verify the accuracy of the requested information, quotes, and/or citations, and in some instances, may generate and display reliability indicators for each citation. In this manner, the issues of hallucinations and misleading or inaccurate representation of source documents and information can be mitigated or avoided. As a result, user confidence in information retrieval and/or extraction can be improved accordingly.

LLMs are also susceptible to prompt injection attacks in which user inputs contain attempts by users to cause the LLMs to output adverse (e.g., malicious, adversarial, off-topic, or other unwanted) results or attempts by users to "jailbreak" LLMs. To mitigate such adverse or malicious inputs for LLMs as described herein, example pairs of dialogue context responses that contain the adverse inputs and mitigation responses may be identified based on similarity evaluation of the example pairs and the current dialogue context. The subset of the similar adverse dialogue context response pairs is incorporated into future LLM prompts. When the LLM runs the prompt with the subset of similar example pairs, the LLM is less likely to provide an improper output in response to a malicious input. In this manner, by including adverse input mitigation examples, prompt injection attacks or other adverse inputs (collectively also referred to as "jailbreaking") can be mitigated or avoided in an effective and scalable manner.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIG. 3B depicts an example user interface that may be used when implementing confidence enhancement for responses by document-based AI Models.

DETAILED DESCRIPTION OF CERTAIN EMBODIMENTS

Figure 1:
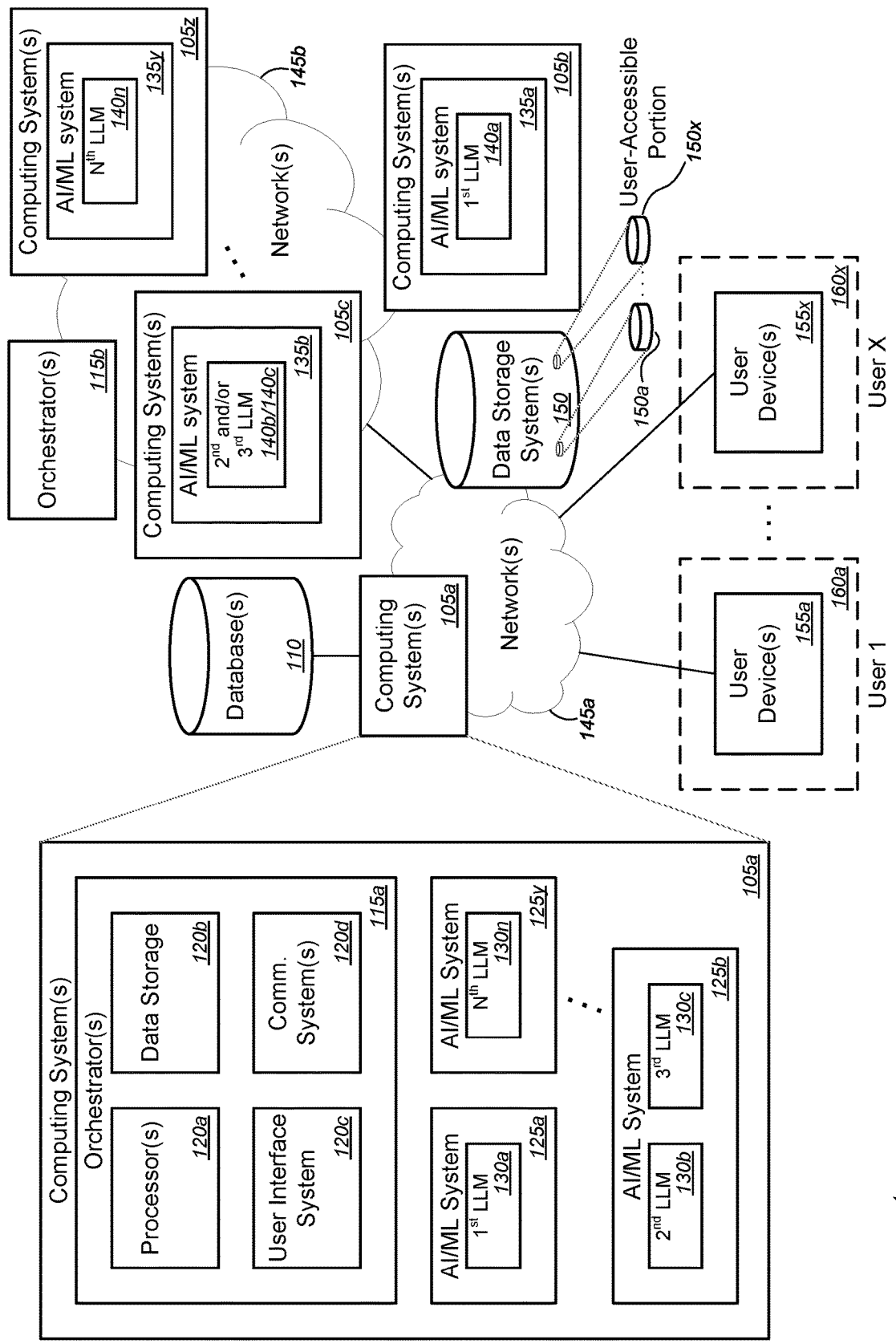
FIG. 1 depicts an example system for implementing at least one of conversational LLM-based user tenant orchestration, confidence enhancement for responses by document-based LLMs, and/or adverse or malicious input mitigation for LLMs.

As briefly discussed above, conversational LLM-based user tenant orchestration provides a solution to the problem of ineffective access to data in information sources (such as in a multitenancy context) that continue to vastly increase in size and scope. The conversational LLM-based user tenant orchestration technology enables easy and effective search and information access within a multitenancy context, based on use of NL requests. The conversational LLM-based user tenant orchestration technology also enables use of AI functions to process the data items that are retrieved from the user-accessible portions of the data storage systems.

The confidence enhancement technology provides a solution to the common problem of hallucination, by utilizing LLMs to generate citations and structured objects to present or display the citations to sources of extracted information that are requested by a user. LLMs may also be used to verify the citations, and in some cases, to provide reliability indicators for each citation.

The adverse or malicious input mitigation technology provides a solution to the problem of inaccurate or harmful outputs from LLMs, by utilizing LLMs to generate a subset of example pairs. The subset of example pairs is generated from filtering larger sets of adverse dialogue context response pairs, and, in some cases, of non-adverse dialogue context response pairs as well, based on similarity evaluation with the current dialogue context. Using the subset of example pairs in a prompt to an LLM ensures that known attempts by users entering adverse inputs to subvert outputs of LLMs would be mitigated by the LLM following the adverse mitigation responses and/or the non-adverse examples.

Various modifications and additions can be made to the embodiments discussed without departing from the scope of the disclosed techniques. For example, while the embodiments described above refer to particular features, the scope of the disclosed techniques also includes embodiments having different combination of features and embodiments that do not include all of the above-described features.

FIGS. 1-8 illustrate some of the features of a method, system, and apparatus for implementing cloud distributed database provisioning, and, more particularly, to methods, systems, and apparatuses for implementing at least one of conversational LLM-based or AI/ML-based user tenant orchestration, confidence enhancement for responses by document-based LLMs or AI models, and/or adverse or malicious input mitigation for LLMs or AI models, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

FIG. 1 depicts an example system 100 for implementing at least one of conversational LLM-based user tenant orchestration, confidence enhancement for responses by document-based LLMs, and/or adverse or malicious input mitigation for LLMs. System 100 includes computing systems 105a-105z (collectively, "computing systems 105") and at least one database 110, which may be communicatively coupled with at least one of the one or more computing systems 105. In some examples, computing system 105a may include orchestrator 115a, which may include at least one of one or more processors 120a, a data storage device 120b, a user interface ("UI") system 120c, and/or one or more communications systems 120d. In some cases, computing system 105a may further include artificial intelligence ("AI") and/or machine learning ("ML") systems 125a-125y (collectively, "AI/ML systems 125") that each uses at least one of first through $N^{th}$ LLMs 130a-130n (collectively, "LLMs 130"). The LLMs 130 are generative AI/ML models that operate over a sequence of tokens, while the AI/ML systems 125 are computing systems that utilize these generative AI/ML models. Herein, an LLM, which is a type of language model ("LM"), may be a deep learning algorithm that can recognize, summarize, translate, predict, and/or generate text and/or other content based on knowledge gained from massive datasets. In some examples, a "language model" may refer to any model that computes the probability of X given Y, where X is a word, and Y is a number of words. As discussed above, while the examples discussed herein are described as being implemented with LLMs, other types of generative AI/ML models may be used in some examples.

The orchestrator 115a and the AI/ML systems 125a-125y may be disposed, located, and/or hosted on, or integrated within, a single computing system. In some examples, the orchestrator 115a and the AI/ML systems 125a-125y may be a co-located (and physically or wirelessly linked) set of computing systems (such as shown in the expanded view of computing system 105a in FIG. 1. In other examples, the components of computing system 105a may be embodied as separate components, devices, or systems, such as depicted in FIG. 1 by orchestrator 115b and computing systems 105b-105z.

For example, AI/ML system 135a (which is similar, if not identical, to AI/ML system 125a), which uses first LLM 140a (similar to first LLM 130a), may be disposed, located, and/or hosted on, or integrated within, computing system 105b. Similarly, AI/ML system 135b (which is similar, if not identical, to AI/ML system 125b), which uses second and/or third LLMs 140b and/or 140c (similar to LLMs 130b and 130c), may be disposed, located, and/or hosted on, or integrated within, computing system 105c. Likewise, AI/ML system 135y (which is similar, if not identical, to AI/ML system 125y), which uses $N^{th}$ LLM 140n (similar to $N^{th}$ LLM 130n), may be disposed, located, hosted on, and/or integrated within, computing system 105z. Herein, N, n, y, and z are positive integer values, where N=n and n>y≥z. In some examples, orchestrator 115b and each of computing systems 105b-105z are separate from, yet communicatively coupled with, each other. Orchestrator 115b, AI/ML systems 135a-135y, LLMs 140a-140n, and computing systems 105b-105z are otherwise similar, if not identical, to orchestrator 115a, AI/ML systems 125a-125y, LLMs 130a-130n, and computing system 105a, respectively.

According to some embodiments, computing system 105a and database 110 may be disposed or located within network 145a, while orchestrator 115b and computing systems 105b-105z may be disposed or located within network 145b, such as shown in the example of FIG. 1. In other embodiments, computing system 105a, database 110, orchestrator 115b, and computing systems 105b-105z may be disposed or located within the same network among networks 145a and 145b. In yet other embodiments, computing system 105a, database 110, orchestrator 115b, and computing systems 105b-105z may be distributed across a plurality of networks within network 145a and network 145b.

In some embodiments, system 100 includes data storage system 150, user devices 155a-155x (collectively, "user devices 155") that may be associated with users 1 through X 160a-160x (collectively, "users 160"). Data storage system 150 includes a plurality of user-accessible portions 150a-150x, each of which is accessible by one of the users 160a-160x, while being inaccessible to other users among the users 160a-160x who do not have administrative access, shared access, or permitted access. Herein, X and x are each any suitable positive integer value. Networks 145a and 145b (collectively, "network(s) 145") may each include at least one of a distributed computing network(s), such as the Internet, a private network(s), a commercial network(s), or a cloud network(s), and/or the like. In some instances, the user devices 155 may each include one of a desktop computer, a laptop computer, a tablet computer, a smart phone, a mobile phone, or any suitable device capable of communicating with network(s) 145 or with servers or other network devices within network(s) 145. In some examples, the user devices 155 may each include any suitable device capable of communicating with at least one of the computing systems 105a-105z and/or orchestrator 115b, and/or the like, via a communications interface. The communications interface may include a web-based portal, an application programming interface ("API"), a server, a software application ("app"), or any other suitable communications interface (not shown), over network(s) 145. In some cases, users 160 may each include, without limitation, one of an individual, a group of individuals, or agent(s), representative(s), owner(s), and/or stakeholder(s), or the like, of any suitable entity. The entity may include, but is not limited to, a private company, a group of private companies, a public company, a group of public companies, an institution, a group of institutions, an association, a group of associations, a governmental agency, or a group of governmental agencies.

In some embodiments, the computing systems 105a-105z may each include, without limitation, at least one of an orchestrator (e.g., orchestrators 115a or 115b), a chat interface system, a human interface system, an information access device, a server, an AI/ML system (e.g., LLM-based systems 125a-125y and/or 135a-135y), a cloud computing system, or a distributed computing system. Herein, "AI/ML system" or "LLM-based system" may refer to a system that is configured to perform one or more artificial intelligence functions, including, but not limited to, machine learning functions, deep learning functions, neural network functions, expert system functions, and/or the like. Herein, "chat interface system" (also referred to as a "chatbot") may refer to a chat service user interface with which users may interact, while "human interface system" may refer to any suitable user interface between a human and a computing system. Such suitable user interface may include at least one of a chat user interface, a voice-only user interface, a telephone communication user interface, a video communication user interface, a multimedia communication user interface, a virtual reality ("VR")-based communication user interface, an augmented reality ("AR")-based communication user interface, or a mixed reality ("MR")-based communication user interface. Herein, "natural language" may refer to language used in natural language processing and may be any human language that has evolved naturally through use and repetition without conscious planning or premeditation. Natural languages differ from constructed languages, such as programming languages. Natural languages take the form of written language, spoken language (or speech), and/or sign language.

Figure 3A:
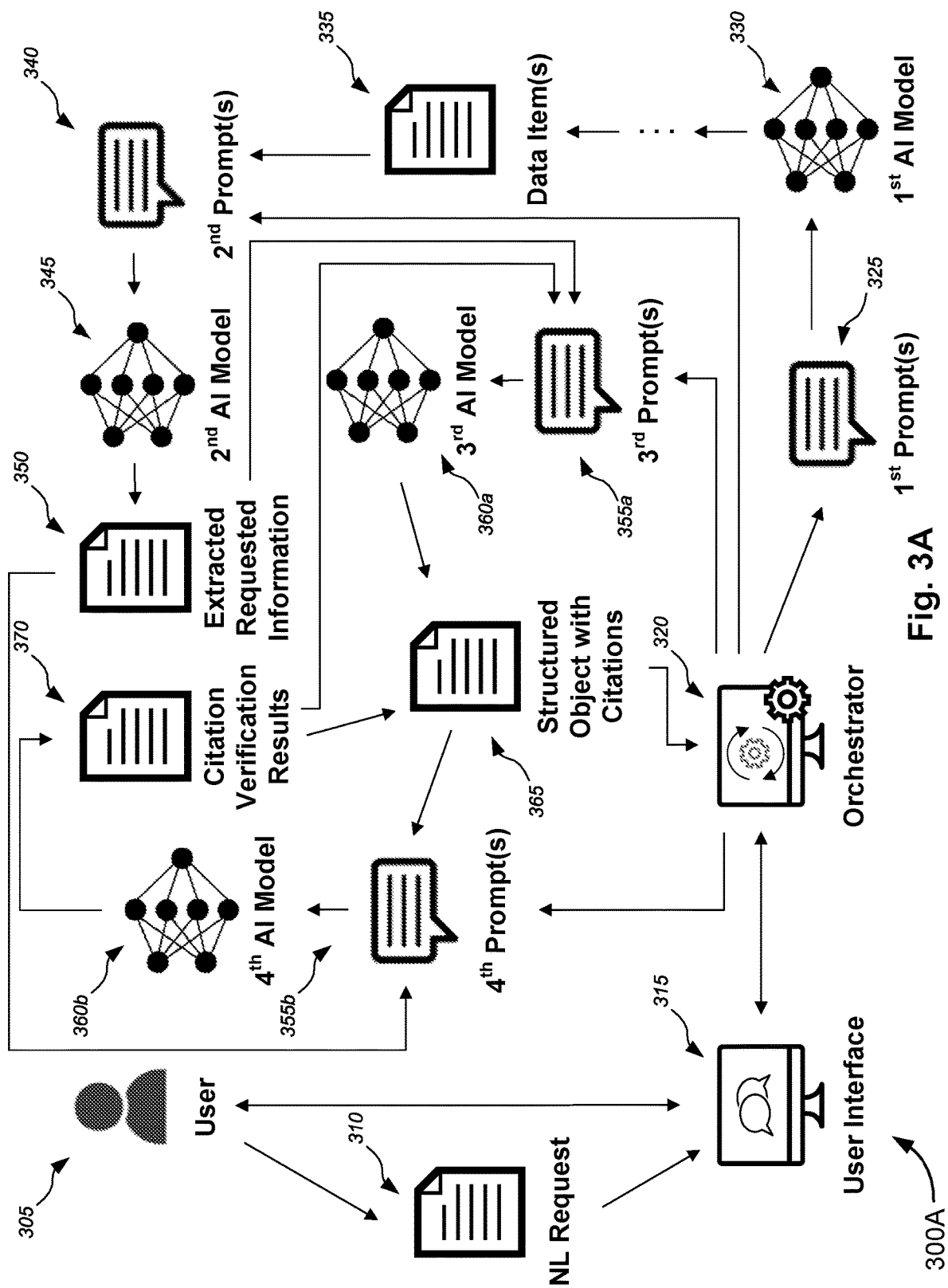
FIG. 3A depicts a block diagram illustrating an example data flow for implementing confidence enhancement for responses by document-based AI Models.
Figure 4:
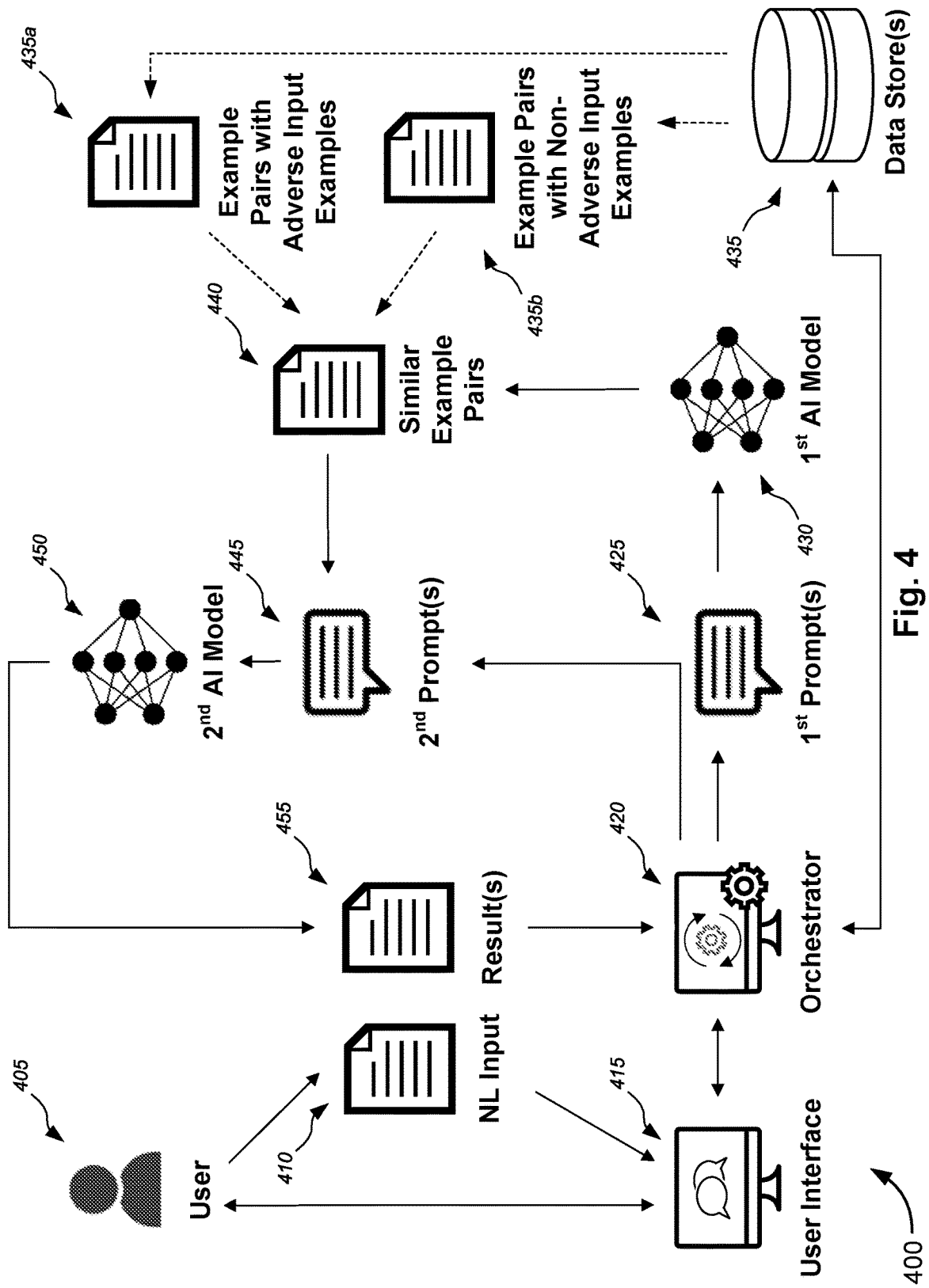
FIG. 4 depicts a block diagram illustrating an example data flow for implementing adverse or malicious input mitigation for AI Models.
Figure 6A:
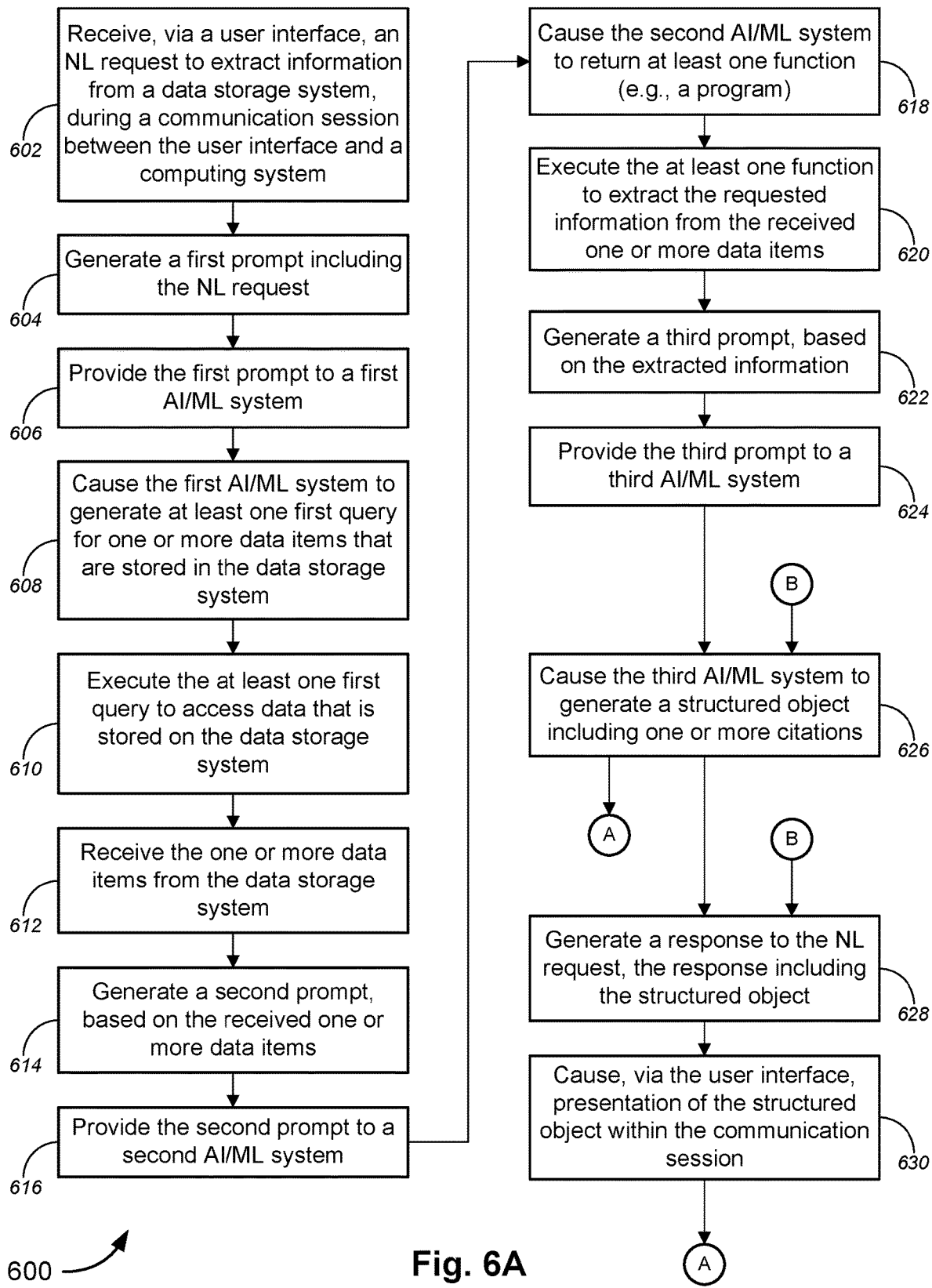
FIGS. 6A and 6B depict an example method for implementing confidence enhancement for responses by document-based AI Models.
Figure 6B:
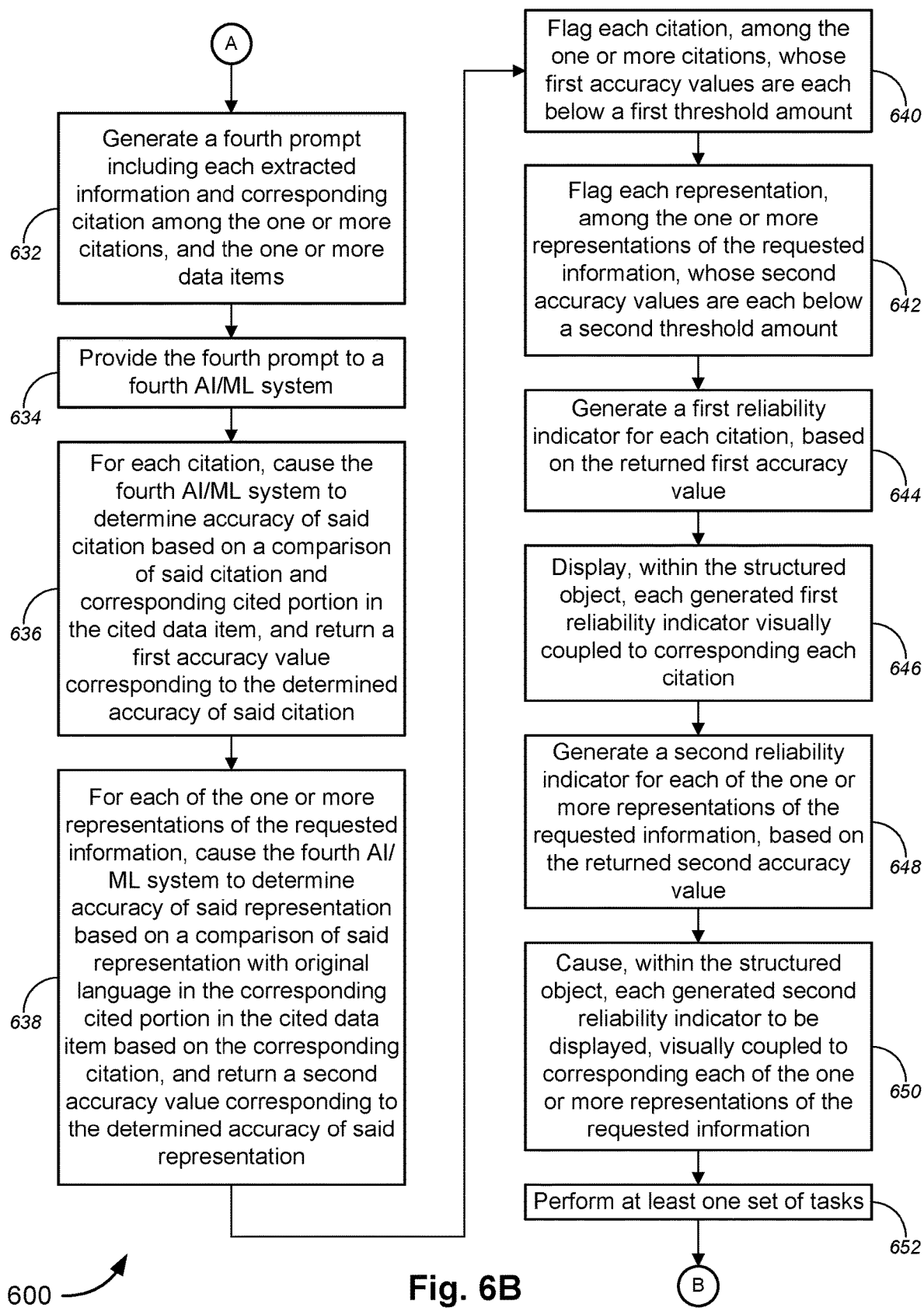
Figure 7:
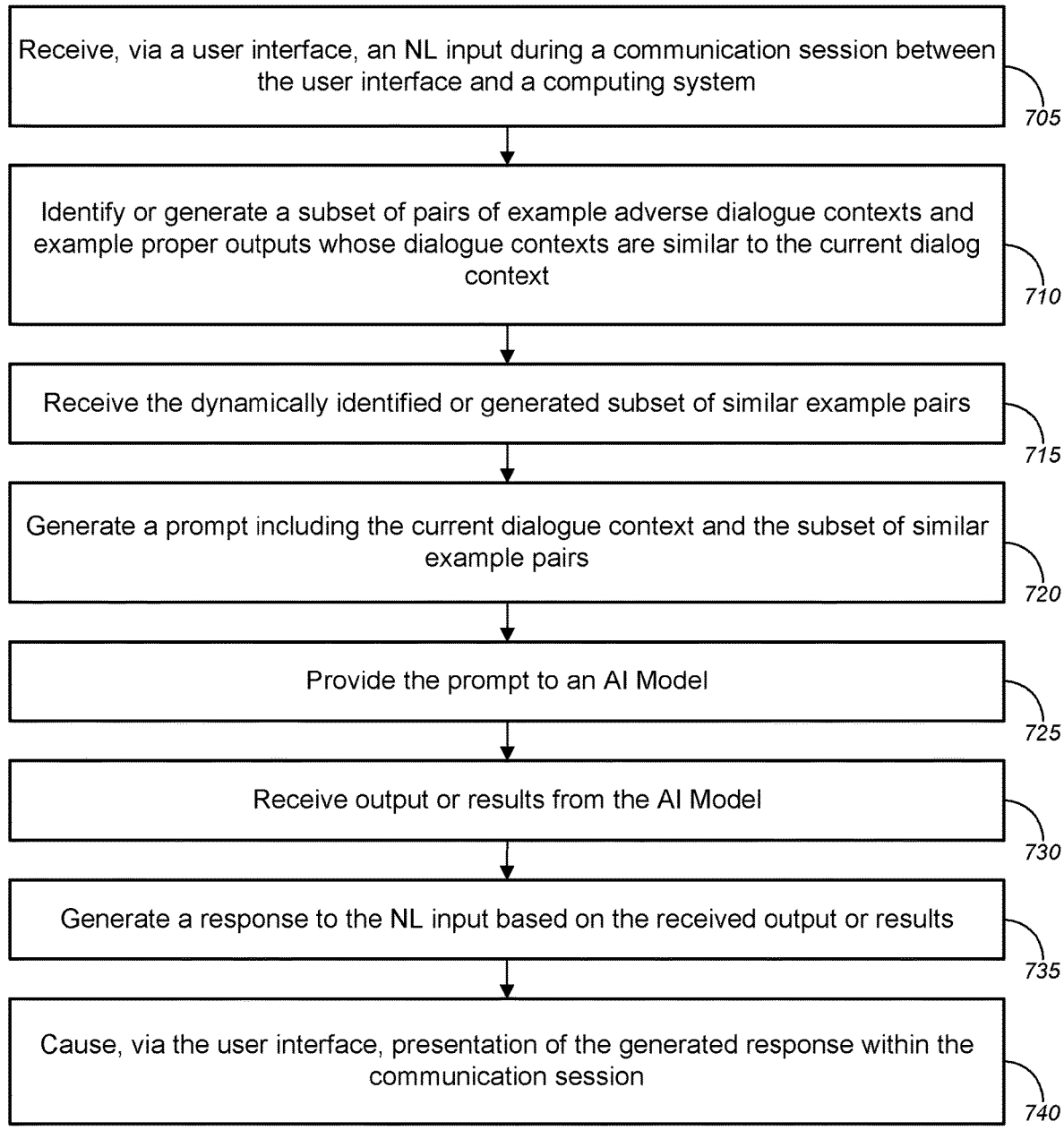
FIG. 7 depicts an example method for implementing adverse or malicious input mitigation for AI Models.

In operation, computing systems 105a-105z, and/or orchestrators 115a or 115b (collectively, "computing system") may perform methods for implementing at least one of conversational LLM-based user tenant orchestration (as described in detail with respect to FIGS. 2, 5, and 8), confidence enhancement for responses by document-based LLMs (as described in detail with respect to FIGS. 3 and 6), and/or adverse or malicious input mitigation for LLMs (as described in detail with respect to FIGS. 4 and 7).

Figure 2A:
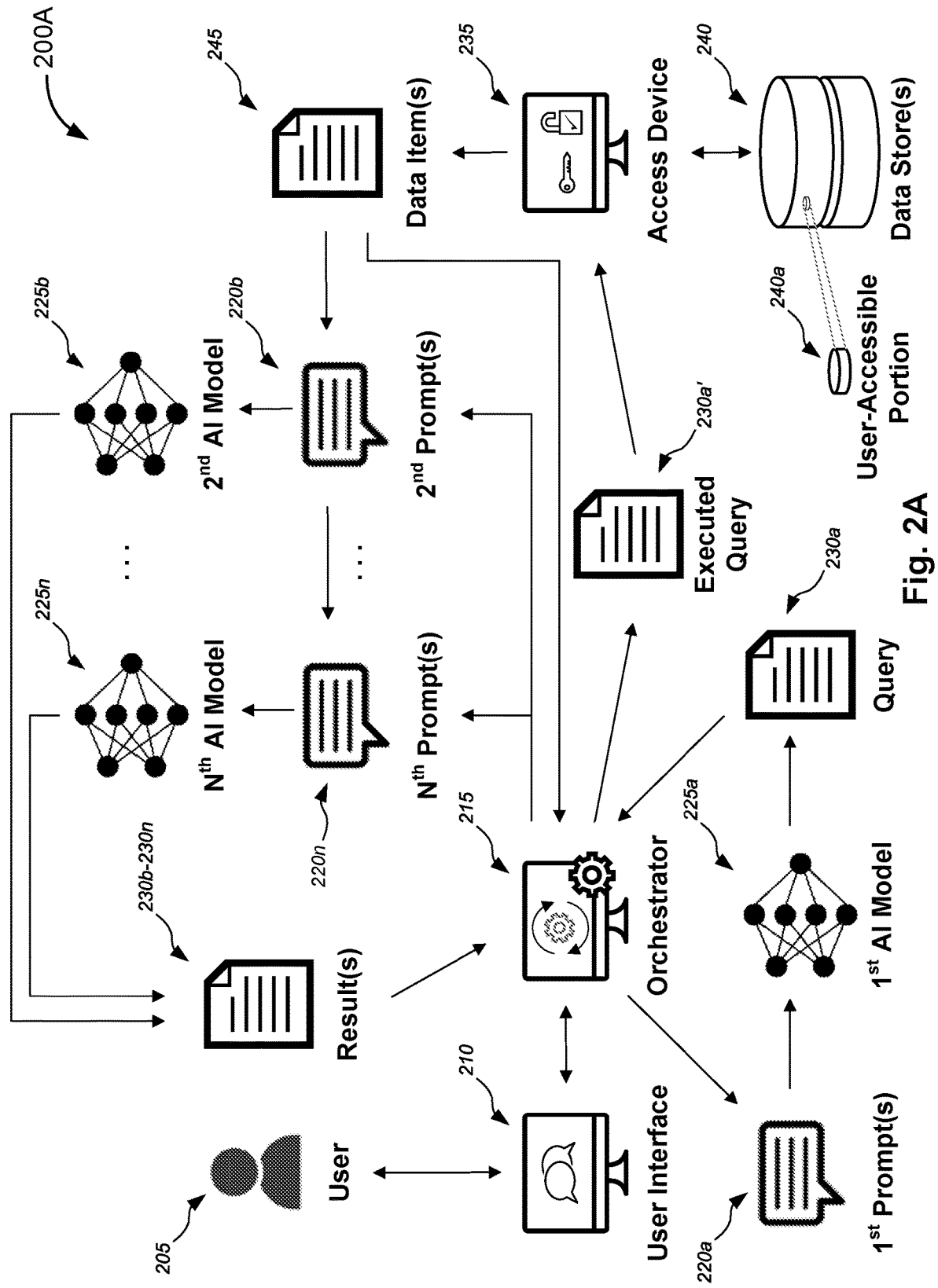
FIG. 2A depicts a block diagram illustrating an example data flow for implementing conversational AI/ML-based user tenant orchestration.
Figure 2B:
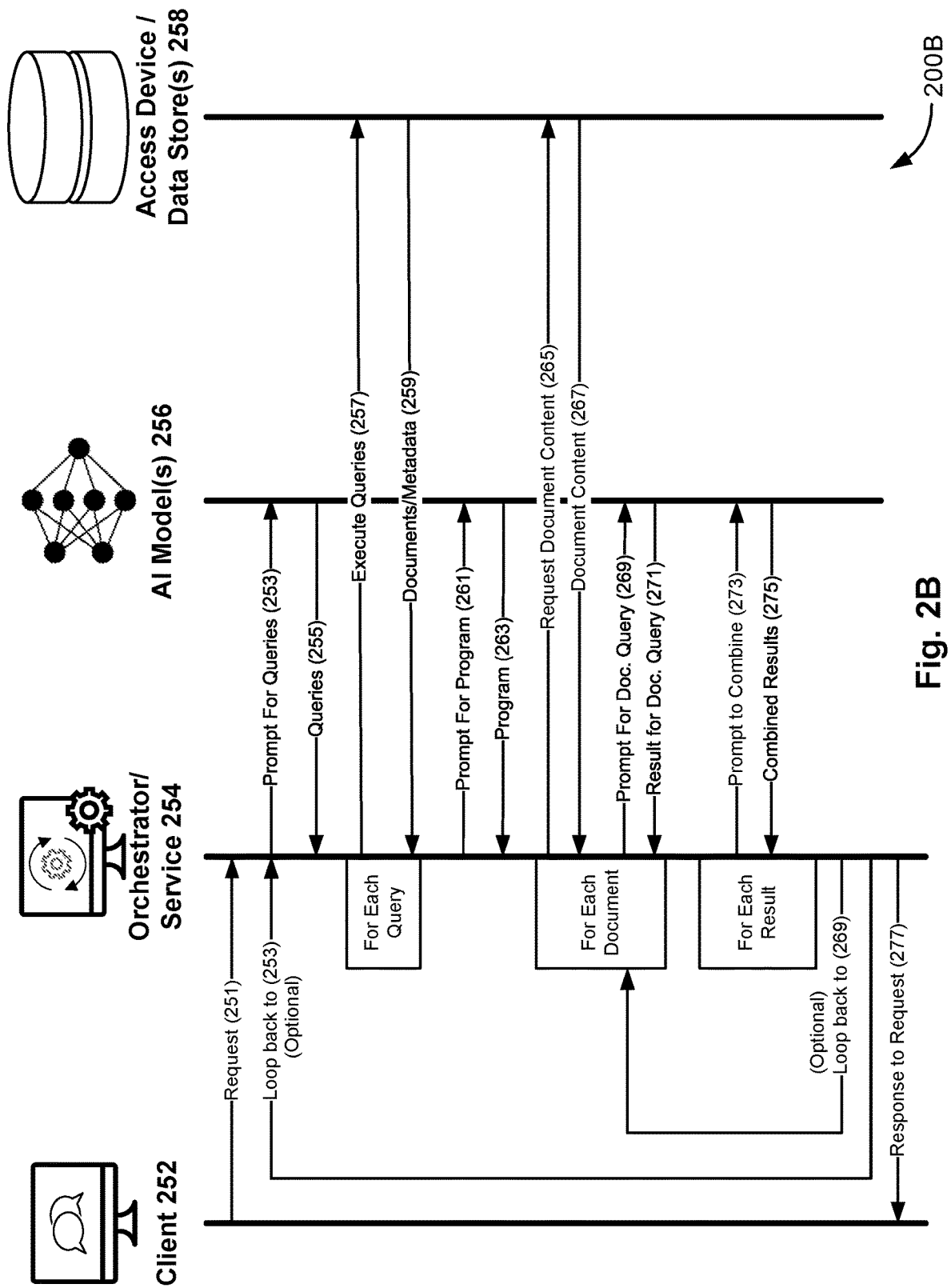
FIG. 2B depicts an example sequence diagram for implementing conversational AI/ML-based user tenant orchestration.
Figure 2C:
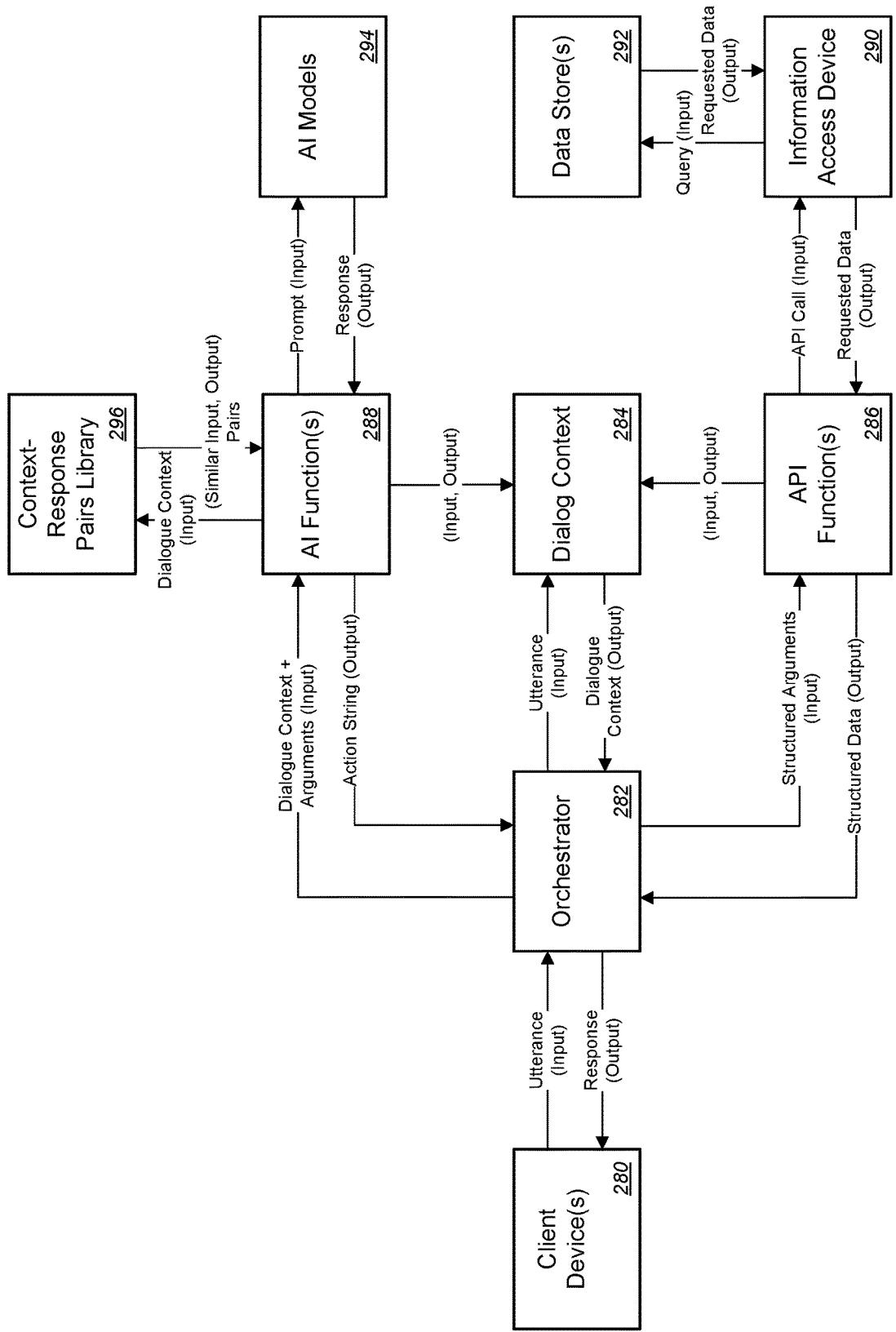
FIG. 2C depicts a block diagram illustrating another example data flow for implementing conversational AI/ML-based user tenant orchestration.

FIG. 2A depicts a block diagram illustrating an example data flow 200A for implementing conversational AI/ML-based user tenant orchestration. FIG. 2B depicts an example sequence diagram 200B for implementing conversational AI/ML-based user tenant orchestration. FIG. 2C depicts a block diagram illustrating another example data flow 200C for implementing conversational AI/ML-based user tenant orchestration. In the example data flow 200A of FIG. 2A, the example sequence diagram 200B of FIG. 2B, and the example data flow 200C of FIG. 2C, user 205, user interface 210, orchestrator 215, 254, and 282, AI Models 225a-225n, 256, and 294, access device 235, 258, and 290, data store(s) 240, 258, and 292, user-accessible portion 240a, and clients or client devices 252 and 280, may be similar, if not identical, to users 160a-160x, user interface system 120c, orchestrator 115a or 115b (or computing systems 105a-105z), LLMs 130a-130n or 140a-140n, computing systems 105a-105z, data storage system 150, user-accessible portions 150a-150x, and user devices 155a-155x, respectively, of system 100 of FIG. 1. The description of these components of system 100 of FIG. 1 are similarly applicable to the corresponding components of FIGS. 2A, 2B, and/or 2C. Although FIGS. 2A, 2B, and 2C are described with respect to using AI Models 225a-225n, LLMs or other types of AI models may be used.

With reference to the example data flow 200A of FIG. 2A, an orchestrator 215 may receive a natural language ("NL") input, from a user 205 via a user interface 210, e.g., during a communication session between the user 205 or user interface 210 and the orchestrator 215. The orchestrator 215 may generate a first prompt 220a including the NL input. In some examples, the communication session includes one of a chat session, a voice-only session, a telephone communication session, a video communication session, a multimedia communication session, a virtual reality ("VR")-based communication session, an augmented reality ("AR")-based communication session, or a mixed reality ("MR")-based communication session. In some cases, the NL input includes one of NL text input, NL voice input, or NL sign language input. In some examples, each NL input may be referred to herein as an "utterance." A number of utterances and corresponding system responses may be part of or may form at least part of a "dialogue context."

The orchestrator 215 provides the first prompt 220a that causes a first AI Model 225a to generate at least one query 230a for one or more data items 245 that are stored in a data storage system or data store 240. Generation of the queries 230a may be based on a generate-query-language function that predicts search queries in a "query language"-like format. The input to this function includes the history of user inputs or utterances so far and any documents that may already be in the current dialogue state. The output is a query 230a or a list of queries 320a. Each query 230a specifies a target content type (like "email," "conversation (business communication platform message)," or "file"), along with keywords and constraints (like "from: Jesse" or "sent: last week"). The queries predicted by the AI model may be translated deterministically by the system code into calls to APIs for other functions or services, such as search services of the information access device 235.

The queries 230a are executed 230a' to access or retrieve data that is stored on a user-accessible portion 240a of the data storage system 240, the user-accessible portion 240a being accessible by the user 205 based on authentication credentials of the user 205. For instance, the authentication credentials of the user 205 may be provided to the information access device 235 that controls access to the data stores 240. In some examples, the orchestrator 215 may translate the at least one query 230a into at least one application programming interface ("API") call for the data storage system 240 and/or the information access device 235. The orchestrator 215 then executes the at least one API call to establish a connection between the orchestrator 215 and the data storage system 240 via access device 235 to retrieve the data items that satisfy the query.

The access device 235 (and/or the orchestrator 215) may determine a level of user access to data stored within the data storage system 240, based on at least one of an account of the user 205 or an authorization level of the user 205. In some cases, executing the query or queries may include executing each query against a user-accessible portion 240a of the data storage system 240. The user-accessible portion 240a may be determined based on the determined level of user access to the data stored within the data storage system 240. Metadata may then be extracted from results of each query, and results from the extracted metadata may be filtered based on the determined level of user access to the data stored within the data storage system 240.

The orchestrator 215 receives the one or more data items 245 from the user-accessible portion 240a of the data storage system 240 and/or the metadata for the data items 245, in response to the executed query or queries 230a'. In some cases, the orchestrator 215 may receive the one or more data items 245 via access device 235. In some examples, the one or more data items 245 may include at least one of one or more documents, calendar events, chat messages, email messages, structured database records, and/or contacts, among other types of data items.

In examples where the data items are returned in response to the query, the orchestrator 215 may extract metadata from the received data items. The extracted metadata may then be added to a dialogue context of the communication session that represents the state of the communication session.

The orchestrator 215 then generates a second prompt 220b including the dialogue context with the extracted metadata from the data items. The orchestrator 215 provides the second prompt 220b to a second AI Model 225b. The second AI Model 225b processes the second prompt 220b to return a custom program formed of a set of functions with corresponding arguments. In some examples, the custom program (e.g., the set of functions; depicted in FIG. 2A as result(s) 230b) is then executed to extract data from data items and a response to the NL input is generated based on the extracted data. The generated response is subsequently caused to be presented to the user 205 via the user interface 210. In some examples, the second AI Model 225b may be the same AI Model as the first AI Model 225a. In other examples, the second AI Model 225b and the first AI Model 225a may be different AI Models.

In some examples, the second prompt 220b includes instructions for the second AI Model 225b, the dialogue context with the metadata, and example pairs of functions and dialogue state examples. In some cases, the dialogue context also includes at least one of a user profile associated with the user 205 and/or a history of NL dialogue including user NL inputs and corresponding system responses.

In some examples, the functions in the customized program, that are returned in the output from the second AI Model 225b, may utilize additional AI operations. For instance, the orchestrator 215 may generate and provide one or more additional prompts (e.g., third through $N^{th}$ prompts 220c-220n) to corresponding one or more additional AI Models (e.g., third through $N^{th}$ AI Models 225c-225n) to produce additional results 230c-230n. In some examples, two or more of the AI Models 225a-225n may be the same AI Models. In other examples, all of the AI Models 225a-225n may be the same AI Models. In yet other examples, none of the AI Models 225a-225n are the same (i.e., all may be different AI Models). Each additional prompt among the prompts 220c-220n may be based on, and/or may include, contents of the previous prompt(s) (e.g., prompts 220b-220(n-1), and/or may contain results 230b-230(n-1) that are output from the previous AI Models 225b-225(n-1). For example, the third prompt 220c may be based on the second prompt 220b, which contains the one or more data items 245. The third prompt 220c may be generated based on the arguments set forth in the functions of the program (depicted in FIG. 2A as result(s) 230b) returned from the second AI Model 225b. In some examples, the set of functions may include a set of AI functions including at least one of a query-documents function, a direct-response function, a respond-with-result function, or a respond-with-prompt function.

The query-documents function performs any necessary information extraction step from documents that were retrieved by the queries (e.g., from the generate-query-language functions or otherwise added to the dialogue state through other methods). The inputs to the query-documents function include a list of documents and a command to use to extract information from those documents. The inputs are provided as a prompt to an AI Model, and the output from the AI Model includes the requested information. In some cases, AI model may include one of a language model ("LM"), a LLM, a generative ML model, or a generative deep learning ("DL") model. In some examples, citations from where in the document the information was extracted are also included in the results.

The execution of the functions, such as the query-documents function, potentially involves multiple calls to one or more AI Models. For example, for each document in the list of documents provided to the function (e.g., documents returned in response to the query), the system issues at least one AI Model call. If the document is too long to fit in the AI Model's context window (e.g., a prompt length limit), then the document is split into multiple chunks and one query is issued per chunk. Subsequently, one or more queries are executed to combine the results from each chunk. If there is more than one document, another AI Model call is issued to combine the results from all of the documents. This processing may be referred to as "map reduce," where the operation on each chunk of the document is a "map" and the combining of results (either across chunks of a document or across multiple documents) is a "reduce."

Of note, the documents on which to operate and the commands to use to extract information are both predicted by the orchestrator 215 via calls to corresponding AI Models. Given the retrieved content, the orchestrator may decide to extract information from only one of them, from several of them, or from all of them. For example, given a user utterance (like, "How many people have emailed me about blockers this week?") and a collection of emails retrieved by queries, the orchestrator may choose to run a query-documents function on all retrieved content, using the command, "If this email is about blockers, output the person who sent it." The results from each email may then be combined into a list (and a count) of people by the reduce operation.

As another example function, the direct response function may be used when the orchestrator 215 can answer the user utterance without needing to extract information from documents using a query-documents call. The direct-response function outputs a direct response call. Three main cases where the model may choose to respond directly may be considered. In one case, the document metadata already has all information necessary to answer the user request. For instance, for an utterance, "What's the new link to the SM OKRs?" the response is just the retrieved document, or more specifically, the location of the retrieved document which is in the metadata for the document. The system does not have to and does not need to look inside the document to identify an answer. In another case, the user utterance includes manipulating prior returned content or model output, such as "Shorten that to 300 words" after a request to draft an email based on some retrieved content. In yet another case, the user is asking the orchestrator to do something that the orchestrator is not capable of performing or otherwise does not require looking at the documents in the context.

As yet another example function, the respond-with-result function is used when the result of the last query-documents call should be returned directly to the user. This function may be appropriate when the user is asking for information that can be directly extracted from the document and should not need further manipulation. There may be no AI Model call involved in executing this function.

As still another example function, the respond-with-prompt function is used when the result of issuing one or more query-documents calls needs further manipulation in order to handle the user's request. Two broad use cases for this function may be considered. The first case is where only one query-documents function call is needed, but some operation is necessary after having retrieved the required information. For example, consider a user utterance such as "Write a poem about M365 Chat." The orchestrator may issue a query-documents call to obtain information about M365 Chat, then the orchestrator might re-prompt the AI Model to write a poem using the information that was retrieved. The second case is where multiple calls to query documents need to be combined to synthesize a response. One example of this case results from a user utterance like, "Rewrite the MAGE OKRs section in the SM OKRs document following the required format given in the OKR Process doc." To respond to this utterance, the orchestrator 215 may retrieve the MAGE OKRs section with one query-documents call, obtain information about the required format from another query-documents call, and then issue another call to the AI Model with a prompt that contains both results and instructions for how to combine them. The respond-with-prompt function takes as input a list of results from prior query documents calls, and a prompt to use for the final AI Model call. The prompt is predicted by the orchestrator, using special variables to refer to the results of the query-documents calls.

FIG. 2B depicts an example sequence diagram 200B for implementing conversational AI/ML-based user tenant orchestration. The data sequence may begin with a request 251 being sent from the client 252 to the orchestrator 254, which may be operating as a chat service in this example. The request 251 may be an NL input, and in the present example may be the utterance, "How many people have emailed me about blockers this week?"

In response to the request 251, the orchestrator 254 generates a prompt for queries 253 that is transmitted as input into one or more AI Models 256. At this stage, the AI Model 256 may operate as a query language model that predicts one or more queries. Continuing the above example, the AI Model 256 generates, as output, at least one query 255, such as: 'email_query("blockers sent: 'this week")).' The generated queries 255 are then provided back to the orchestrator/service 254.

For each of the queries 255, an execute query request 257 is provided to the access device or data store(s) 258. The execute query request 257 may also include user credentials, authentication details, or other account information that allows the access device or data stores 258 to determine the subset of the data stores 258 to which the user is able to access. Prior to the execute query request 257 being transmitted, the queries may be transformed into an API call that can be understood and processed by an API of the access device or data store(s) 258.

The data items 259 (and/or their metadata) that are returned from the query are then transmitted from the access device or data store(s) 258 back to the orchestrator 254. Continuing with the above example, the query may identify 10 documents (e.g., emails). The metadata for the documents, such as filename, file path, author, create date, modified date, etc., may be extracted from the 10 documents and/or the metadata may only be returned in response to the execute query request 257.

The metadata for the returned documents is then incorporated into a dialogue context, which is in turn incorporated into a prompt for a program (e.g., a set of functions). The prompt for the program includes the dialogue context and multiple pairs of example functions and example dialogue states, which may be referred to herein as "example function-state pairs." The example function state-pairs indicate which functions, and arguments for those functions, are appropriate for the corresponding dialogue state. By providing the example function-state pairs in the prompt, the AI Model is able to determine which functions and arguments are most appropriate for the current dialogue states as indicated by the current dialogue context in the prompt.

The number of available function-state pairs that are available for selection may exceed the content window or prompt length limitations. For instance, a large database of function-state pairs may be stored and accessed by the orchestrator when forming the prompt for the program. To determine which function-state pairs are to be included in the prompt, a similarity between an input(s) of the current dialogue state and inputs of the dialogue states of the function-state pairs may be analyzed. For instance, a similarity search may be executed against the inputs of the available function-state pairs to identify a top number of function-state pairs that have inputs of dialogue states most similar to the input(s) of the current dialogue state. Those top function-state pairs are included in the prompt for the program.

The prompt for the program 261 is then provided as input to the one or more AI Models 256. The AI Model(s) 256 processes the prompt and returns the program 263, which is transmitted back to the orchestrator 254. At this stage, the AI Model(s) 256 operates as a planning model that is able or configured to generate a program or plan of commands or functions that will result in a response to the request 251 from the client. Continuing with the example above, the program that is returned may include the following functions: (1) QueryDocuments (e.g., "If this email about is blockers, output who it is from") and (2) RespondWithResult.

When the program is received, the functions are performed or executed by the orchestrator 254, which may result in additional calls to the AI Model(s) 256. In the example above, because no specific document or document list is provided as an argument to the Query Documents function, the QueryDocuments function performs a map over all documents in the dialogue context (e.g., the documents 259 that are returned in response to the queries 257). To execute the function over the documents, the content of the documents is required for analysis. Accordingly, a request for the document content 265 is transmitted from the orchestrator 254 to the access device or data store(s) 258. The document content 267 is then returned to the orchestrator 254.

The QueryDocuments command is then executed over the content for each of the documents. Executing the command may result in at least one AI Model call for each document. For instance, a prompt for a document query 269 is generated and transmitted to the AI Model(s) 256. The AI Model(s) 256 generates a result for the document query 271 that is returned back to the orchestrator 254. The prompt for the document query 269 includes the content of the particular document as well as the query command set forth in the function. The prompts for all the documents and processing of the prompts may occur in parallel so that results are generated for each document concurrently via separate AI Model prompts/calls. For instance, the prompt for the document query 269 may include "If this email about is blockers, output who it is from." The result 271 includes either an empty result (e.g., not about blockers) or an answer string (e.g., the name of the sender). Where an answer string is generated, a justification or citation to the document may be provided in the result 271. In some examples, some of the documents can be longer than one context window, and the document may be split into multiple segments with corresponding document query prompts being generated for each segment.

A document-level and/or segment-level reduce step may then be used to combine results. Combining the results may be performed through another AI Model prompt/call. For instance, a combine request and the received results may be included in a combine request 273 that is provided as input into the AI Model 256. The AI Model 256 processes the prompt and returns the combined results 275 back to the orchestrator 254. Multiple combined prompts may be used where multiple different types of results are generated or requested while performing the function.

The reduce or combine operation may identify the total results that are received for the documents. In the example above, the combine operation causes the list of names to be generated. Once the first function has been completed, the next function in the program is executed. In the above example, the next function in the program is a RespondWithResult function. Executing the RespondWithResult function causes the results from the previous function (e.g., the list of names) to be returned to the client 254 as a response to the request 277. In some examples, prior to responding to the request 277, the process may loop back or return to generating and transmitting, to the AI Model(s) 256, one or more additional prompts for document queries 269 et seq. In some examples, prior to responding to the request 277, the process may alternatively, or additionally, loop back or return to generating one or more additional prompts for queries 253 et seq.

In some embodiments, in a debug mode, the system may show all AI Model calls, including the prompt that is sent to an AI Model and the response that was returned. The API calls to other functions or services may also be shown, in addition to the results from issuing those API calls. The system may alternatively or additionally display the following information: (i) some NL description of the queries that are being issued; (ii) the number of results that are obtained from those queries; and/or (iii) a plan or a description of the plan that the planning model produces. In some cases, in addition to the number of results being obtained, individual items may also be provided. In some examples, the description of the plan may include "Getting information from [some documents]" for each query documents process, or "Computing a final result" for a respond with prompt step.

Returning to FIG. 2A, in some examples, executing each function may include several operations. First, an AI Model 225 may generate a first program that maps corresponding arguments and a dialogue context to an input object that encodes the arguments with portions of the dialogue context that are determined to be relevant to determining an output object. The mapping generates a plurality of contextualized inputs for said function. Second, the AI Model 225 may generate a library of example pairs of input objects and corresponding suitable output objects. Third, the AI Model 225 may perform similarity evaluation (or evaluate similarity) between any two contextualized inputs for said function. Fourth, the AI Model 225 may generate a second program that produces a prompt based on the input object. The prompt may include an NL instruction describing a desired relationship(s) between the output object and the input object, example pairs of input objects and corresponding suitable output objects whose inputs are most similar to the input object in the current dialogue context, and the contextualized input object itself. Fifth, the AI Model 225 may determine the output object by finding a probable continuation of the prompt according to a language model.

The orchestrator 215 may receive results 230b-230n of the invoked set of functions, from the AI Models 225. The orchestrator 215 may generate a response to the NL input based on the received results 230b-230n, and may cause the generated response to be presented, to the user 205 and via the user interface 210, within the communication session. In some examples, at least one of the following may be caused to be presented, within the communication session, to the user 205 and via the user interface 210: (a) one or more NL descriptions of queries being executed; (b) a number of results obtained from the queries; or (c) one or more NL descriptions of the second prompt.

In some aspects, in addition or alternative to the processes described above, after receiving the NL input, the orchestrator 215 may determine a first action string based on the NL input, and may execute the first action string. The orchestrator 215 may perform different types of operations. As one example, when the first action string specifies a literal response without accessing additional data, the orchestrator 215 may cause the literal response to the NL input to be presented, to the user 205 and via the user interface 210, within the communication session. As another example, when the first action string specifies a first AI function and corresponding first set of arguments, the orchestrator 215 may invoke the first AI function based on the set of arguments to determine a second action string and executing the second action string. As yet another example, when the first action specifies a second AI function and corresponding plurality of sets of arguments, the orchestrator 215 may separately invoke the second AI function based on each of the plurality of sets of arguments to generate respective outputs. The orchestrator 215 may subsequently invoke a third AI function to combine the outputs to determine a third action string. As still another example, when the first action specifies an API function and corresponding set of arguments, the orchestrator 215 may translate the API function and corresponding set of arguments.

FIG. 2C depicts an example data flow 200C for implementing conversational AI/ML-based user tenant orchestration. An orchestrator 282 may receive an utterance as input from client device(s) 280 via a user interface (as described above). The orchestrator 282 may send the utterance as input to update the current dialogue context 284. For instance, on the first turn or interaction, the dialogue context 284 may include the utterance and, in some examples, elements from a profile of the user that submitted the utterance. As additional functions are processed, the dialogue context 284 may be updated to record the performance of those additional functions. For instance, the inputs and outputs of each performed function may be stored in the dialogue context 284, as discussed further below. Similarly, when additional utterances are received, those utterances can also be added to the dialogue context 284. Accordingly, the orchestrator 282 may then retrieve a current or updated dialogue context 284 that reflects the current dialogue state and function state or the communication session.

In some examples, when the orchestrator 282 receives an utterance, the orchestrator 282 calls an AI function 288. The first AI function that is called may be a START AI function. Executing the AI function call causes an input for the called AI function 288 to be generated. The input may include the current dialogue context 284 and, in some cases, additional arguments for the AI function 288. The AI function 288 is computed. In general, computing the AI function 288 causes the AI function 288 to map the current dialogue context 284 to a text string, which may be referred to as an action string that describes the next actions (e.g., a sequence of actions) to be taken, as discussed further below.

As more detail regarding computing the AI function 288, the AI function 288 maps the dialogue context and the zero or more arguments to a string x (referred to as the input string). The input string x encodes the arguments (where present) together with aspects of the dialogue context that may be useful in predicting an output string y.

Computing the AI function may also include referencing an example context-response pairs library 296. The library 296 includes example pairs of inputs ($x_i$) and outputs ($y_i$) such that each $x_i$ is an input string and the corresponding $y_i$ is a desirable output string for that input string. One example of the example context-response pairs are the function-state pairs discussed above. To utilize the example pairs in the library 296, a similarity function may be performed that evaluates the similarity of the current input x to the inputs ($x_i$) in the library 296. The similarity function may be performed using neural networks, BM25 algorithms, and/or other similarity or matching functions. The example pairs ($x_i$, $y_i$) that have an input ($x_i$) that are most similar to the current input (x) or dialogue context are returned from the library 296 (e.g., N number of closest matching pairs). In examples, each AI function 288 may have its own library 296 that is different from the libraries 296 of other AI functions 288. In some examples, two or more AI functions 288 may share the same library 296. In an example, the number, N, of similar example pairs in the prompt may be zero; in other words, for some AI functions, such similar example pairs are not needed.

The AI function 288 then produces a prompt (which may be a text string) that includes a natural language instruction describing how the output string y from an AI model should be related to the input string x, the similar example pairs ($x_i$, $y_i$) from the library 296, and the input string x. The prompt is then provided as input to an AI model 294. In some examples, the AI model 294 may include at least one of a language model ("LM"), a large language model ("LLM"), a generative ML model, or a generative deep learning ("DL") model. In some cases, the AI function 288 may further define and/or include selecting one of the LM, the LLM, the generative ML model, or the generative DL model, to which to provide the prompt, based on an estimation of resources required by the AI model 294 to produce the output. The output may be generated by the AI model 294 finding a probable continuation of the prompt, in some cases, by using a beam search decoder. The AI model 294 then returns an output (which may be a text string) that either includes the action string and/or the AI function 288 generates the action string based on the output received from the AI model 294. The AI function 288 then returns an action string to the orchestrator 282. The AI function may also update the dialogue context 284 with the input and output of the AI function 288.

The orchestrator 282 then receives the action string from the AI function 288. Subsequently, a sequence of operations may be performed based on the action string. For instance, the action string may be in the form of a programming language that is understood by the orchestrator 282, and the action string may define one or more operations that are to be performed by the orchestrator 282. In some examples, the sequence of operations may include at least one of (a) calling and computing one or more other AI functions 288; (b) calling and performing an API function 286; and/or (c) outputting a direct result (e.g., returning a response or output to the client device 280) without calling other AI functions 288 API functions 286. Where a second AI function 288 is called by the orchestrator 282, the second AI function may be performed in a similar manner as discussed above.

Where an API function 286 is called as the next operation in the sequence defined by the action string, structured arguments may be provided, by the orchestrator, as input for the API function 286. The API function 286, when performed, may send an API call as input for an information access device 290. The information access device 290 may generate a query as input to data store(s) 292, based on the API call. The information access device 290 may receive, retrieve, and/or access the requested data as output from the data store(s) 292, in some cases, from a user-accessible portion of the data store(s) (as described in detail above with respect to FIG. 2A). The information access device 290 may send the requested data (e.g., data items, documents, metadata, etc.) as output to be received by the API function 286. The API function 286 may then structure the received data from the information access device 290 and output the structured data to the orchestrator 282.

Upon receiving the structured data from the API function 286, the orchestrator 282 performs the next operation in the sequence of operations defined by the action string received from the AI function 288. This operation may include returning the structured data to the client 280 in the form of a response, conducting another API function call 286, and/or another AI function call 288.

In some examples, the action string may specify a single named AI function 288 and a tuple of arguments for which the AI function is to be called. That named AI function 288 is then called on that tuple of arguments in the current dialogue context 284 to generate a new action string. In other examples, the action string that is received from the AI function 288 specifies a named AI function 288 and multiple argument tuples that are to be mapped. In such examples, the named AI function 288 may be called separately on each of the argument tuples specific in the action prompt. The calls and the computing of the AI functions 288 may be performed in parallel, and the corresponding calls/inputs and their resulting output strings (e.g., action strings) may be again added to the dialogue context 284.

In a set of examples, the information access device 235, 258, or 290 provides an end user (e.g., user 205) with access to various items of information stored on an enterprise information store (e.g., data storage system or data store 240, 258, or 292). For example, in an enterprise context, the information access device may consult the enterprise information store that stores written documents, calendar events, sent and received messages, structured database records, and other information items created in the course of business. The information access device authorizes each end user (e.g., each employee) to access some subset of the information items. In addition, the information access device 235, 258, or 290 provides an API that allows another program to retrieve relevant items from a given end user's accessible subset by issuing an appropriate query to the API. For example, such a query may ask to retrieve the email messages accessible to the user that were sent in a given date range and are most relevant to the phrase "purchase orders." The API may also allow programs to modify or delete specific items that have been retrieved or to add new items.

In some examples, the system responds to each user utterance by orchestrating calls to various AI functions. In an example, an AI function START is invoked to map the current dialogue context, including the user's most recent utterance, to a text string, known as the action string, that describes an appropriate next action. The action string is then executed under one of several conditions. As one example, if the action string specifies a literal or direct response to the user, then that response is issued and it becomes the user's turn. For instance, the literal or direct responses may include "You have 3 meeting"; "Alice is Bob's manager"; "Here is a table of prices and quantities sold: . . . "; "I'm sorry Dave, I'm afraid I can't do that."

In another example, if the action string specifies a named AI function and a tuple of arguments (or finite ordered list of arguments) on which to call the AI function, then that AI function is called on those arguments in the current dialogue context to yield a new action string. Then the procedure repeats with the execution of the new action string. For instance, the AI function indicates to summarize previously retrieved document #3, or to carry out a specified NL instruction on that document, such as "extract the prices and quantities sold." In the latter case, the AI function would be EXTRACT, and its arguments would be the document ID and the fields to extract. The AI function returns an action string that specifies a literal response to the user, namely the summary or a description of the prices and quantities sold.

In yet another example, if the action string specifies a named AI function and multiple argument tuples to map it over, then the AI function is called separately (in the current dialogue context) on each argument tuple. These calls may be made in parallel. These calls and their resulting output strings become part of the dialogue context. Another AI function REDUCE is now invoked to map the new dialogue context to a new action string. Then the procedure repeats with the execution of the new action string. For instance, the action string again says to EXTRACT prices, but now from each of the previously retrieved documents #3, #4, and #6, or in another example, from each of the email messages retrieved by the previous API call. The new action string says to COLLATE the results into a formatted table.

In still another example, if the action string describes an API function and a tuple of arguments on which to call the API function, the API function is programmatically translated into an actual API call that is issued to the information access device. This action string and the API call's return value, including any retrieved information items, now becomes part of the dialogue context. Another AI function RECEIVE is now invoked to map the new dialogue context to a new action string. Then the procedure repeats with the execution of the new action string. For instance, the API call retrieves the email messages accessible to the user that were sent in a given date range and are most relevant to the phrase "purchase orders." The new action string may indicate to EXTRACT the prices from these emails (since they appear to contain prices), as in the previous example.

Of note, two major problems with using AI functions that interact with an information access device in a natural language dialogue setting are hallucinations and susceptibility to malicious or otherwise off-topic user input. Hallucinations refer to when the AI function produces output that purports to be obtained from the information access device but is not actually present in the information obtained from the device. Susceptibility to malicious inputs refers to the propensity for the AI function to output incorrect, harmful, biased, or otherwise undesirable output when presented with specific, often adversarial, user inputs. One kind of such user inputs is sometimes referred to as "prompt injection attacks" or "jailbreaking." Recently, the term "jailbreaking" has also become the term of art for other malicious or adverse uses as well. The present technology includes specific mechanisms to address these problems, i.e., to mitigate jailbreaking.

In an example implementation for detecting hallucinations, when the AI function is requested to extract information from the information access device, instead of returning a string containing or summarizing the information, the AI function returns a structured object that contains the answer or summary string as well as direct quotes from the information obtained from the access device. The answer string has footnotes that refer to the direct quotes from the information sources, which are maintained or manipulated through all subsequent AI function calls and other API calls and caused to be presented to the user. The direct quotes can be further checked for accuracy by another AI function that determines whether the quotes correctly justify the footnoted text in the answer string. Mitigating hallucinations and enhancing user confidence in AI Models are described in greater detail below with respect to FIGS. 3 and 6.

For detecting malicious inputs and/or for preventing the system from outputting unwanted responses, a set of examples of malicious, off-topic, or otherwise adversarial inputs, along with a proper response to those inputs, may be included in the set of $(x_i, y_i)$ example pairs described above with respect to constructing the library of example pairs. As described above with respect to the program constructing prompts, when an adversarial input is encountered, similar examples are included in the prompt. The AI Model follows the examples and is thus prevented from outputting undesirable responses. The examples may contain instances of users trying over multiple dialogue turns to get the system to output undesirable responses, paired with correct outputs for those inputs. Adverse or malicious input mitigation is described in greater detail below with respect to FIGS. 4 and 7.

FIG. 3A depicts a block diagram illustrating an example data flow 300A for implementing confidence enhancement for responses by document-based AI Models. In the example data flow 300A of FIG. 3A, user 305, user interface 315, orchestrator 320, and AI Models 330, 345, 360a, and 360b may be similar, if not identical, to users 160a-160x, user interface 120c, orchestrator 115a or 115b (or computing system 105a-105z), and LLMs 130a-130n, respectively, of system 100 of FIG. 1. The description of these components of system 100 of FIG. 1 are similarly applicable to the corresponding components of FIG. 3A.

With reference to the example data flow 300A of FIG. 3A, an orchestrator 320 may receive a natural language ("NL") request 310, from a user 305 via a user interface 315, during a communication session between the user 305 or the user interface 315 and the orchestrator 320. The orchestrator 320 may generate a first prompt 325 including the NL input. In some examples, the communication session includes one of a chat session, a voice-only session, a telephone communication session, a video communication session, a multimedia communication session, a virtual reality ("VR")-based communication session, an augmented reality ("AR")-based communication session, or a mixed reality ("MR")-based communication session. In some cases, the NL input includes one of NL text input, NL voice input, or NL sign language input. The orchestrator 320 provides the first prompt 325 that causes a first AI Model 330 to generate at least one query for one or more data items 335 that are stored in a data storage system or data store (not shown in FIG. 3A). FIGS. 2A-2B describe in detail an example of a process of querying for data items, although the various embodiments also allow for other approaches for querying for data items (these are denoted in FIG. 3A by the ellipsis (" . . . ") between the arrows from the first AI model 330 and the data item(s) 335).

After receiving one or more data items 335, the orchestrator 320 may generate a second prompt 340, based on the received one or more data items 335. The orchestrator 320 provides the second prompt 340 that causes a second AI Model 345 to extract the requested information 350 from the received one or more data items 335. In some cases, extraction may be performed by using the second prompt 340 to cause the second AI Model 345 to output an extract function that when executed (e.g., by orchestrator 320 or other device) causes the requested information 350 to be extracted from the received one or more data items 335. The orchestrator 320 then generates a third prompt 355a that causes an output from a third AI Model 360a to include or generate citations to statements or assertions within the subsequent (to-be-generated) response. In some examples, the one or more citations may include one or more of a citation to each data item or a citation to each portion of each data item, from which the requested information or portions of the requested information were extracted. The orchestrator 320 generates a response to the NL request 310. In some examples, the generated response may include a structured object 365 that includes one or more representations of the requested information and the corresponding one or more citations. The orchestrator 320 causes the structured object 365 to be presented, to the user 305 and via the user interface 315, within the communication session between the user 305 and the orchestrator 320. In some examples, the third AI Model 360a generates the structured object 365 that contains the one or more representations of the requested information and the corresponding one or more citations, and the structured object 365 is included in the response that is generated by the orchestrator 320.

In some examples, each citation among the one or more citations as presented in the generated response or structured object 365 within the communication session may include one of a text-only citation or a text citation together with a navigation link. The navigation link may be a link (e.g., a hyperlink) to a cited portion of the data item or a cited portion of the portion of the data item from which each corresponding requested information or each corresponding portion of the requested information was extracted. In some examples, the one or more representations of the requested information may each include at least one of an answer object (e.g., an answer string) containing the requested information, a summary of the requested information, or one or more quoted portions of at least one data item containing the requested information.

In some examples, the structured object 365 contains information and the corresponding one or more citations. In some cases, the displayed information may include at least one of the answer object (e.g., answer string), the summary of the requested information, or the one or more quoted portions. The corresponding one or more citations may include the one of the text-only citation or the text citation together with the navigation link to the cited portion of the data item or the cited portion of the portion of the data item. In some cases, the corresponding one or more citations may be displayed as one or more footnotes within the structured object 365. While the citations and quotes are purported to be supported by the documents from which the AI Model was analyzing, such citations and/or quotes may actually be hallucinated by the AI Model. Accordingly, the present technology verifies the accuracy of the quotes and/or citations to determine if they are actually supported by the documents.

In some examples, verification may be performed as follows. The orchestrator 320 may generate a fourth prompt 355b, and may provide the fourth prompt 355b to a fourth AI Model 360b. In some examples, two or more of the first through fourth AI Models 330, 345, 360a, and 360b may be the same AI Models. In other examples, all of the first through fourth AI Models 330, 345, 360a, and 360b may be the same AI Models. In yet other examples, none of the first through fourth AI Models 330, 345, 360a, and 360b are the same (i.e., all may be different AI Models). In some cases, the fourth prompt 355b may include the extracted information 350 and corresponding citation among the one or more citations, and content of the one or more data items 335 to which the purported citation points. The fourth prompt 355b may cause the fourth AI Model 360b to perform several operations. First, the fourth AI Model 360b is caused to, for each citation, determine accuracy of said citation, and return (in citation verification results 370) a first accuracy value corresponding to the determined accuracy of said citation. Determining accuracy of each citation may be based on a comparison of said citation and corresponding cited portion in the cited data item. Second, the fourth AI Model 360b is caused to, for each of the one or more representations of the requested information, determine accuracy of said representation, and return a second accuracy value corresponding to the determined accuracy of said representation. Determining accuracy of each representation may be based on a comparison of said representation with original language in the corresponding cited portion in the cited data item based on the corresponding citation.

In some examples, orchestrator 320 or some other computing system (collectively, "computing system") may generate a first reliability indicator for each citation, based on the returned first accuracy value. The computing system may display or incorporate, within the structured object 365, each generated first reliability indicator visually coupled to each corresponding citation. Similarly, the computing system may generate a second reliability indicator for each of the one or more representations of the requested information, based on the returned second accuracy value. The computing system may display, within the structured object 365, each generated second reliability indicator visually coupled to corresponding each of the one or more representations of the requested information.

In some examples, the first and second reliability indicators each includes at least one of a text field containing a percentage value representing a corresponding accuracy value, a graphic field containing a graphical representation of the percentage value, and/or a graphic field containing color-coded graphics each corresponding to a sub-range within a spectrum of the percentage value. For example, reliably accurate citation or representation may be within a percentage range of, e.g., 95% or higher, and may have, e.g., at least one of a green color-coded graphic, a double check-mark graphic, and/or a graphic of reliable accuracy ranking (e.g., A-rank or S-rank). Moderately accurate citation or representation may be within a percentage range of, e.g., between 80 and 95%, and may have, e.g., at least one of an amber color-coded graphic, a single check-mark graphic, and/or a graphic of moderate accuracy ranking (e.g., C-rank or B-rank). Suspect or partially accurate citation or representation may be within a percentage range of, e.g., between 65 and 80%, and may have, e.g., at least one of a pink color-coded graphic, a question-mark graphic, and/or a graphic of suspect accuracy ranking (e.g., E-rank or D-rank). Unreliable, inaccurate, or misleading citation or representation may be within a percentage range of, e.g., below 65%, and may have, e.g., at least one of a red color-coded graphic, a X-mark or cross-mark graphic, and/or a graphic of unreliable accuracy ranking (e.g., F-rank).

In some examples, the computing system may flag each citation, among the one or more citations, whose first accuracy values are each below a first threshold amount (e.g., 50, 60, 70, or 80% likelihood of being accurate, or a range of accuracy percentages between 50 and 80%). Likewise, the computing system may flag each representation, among the one or more representations of the requested information, whose second accuracy values are each below a second threshold amount (e.g., 50, 60, 70, or 80% likelihood of being accurate, or a range of accuracy percentages between 50 and 80%). Although particular examples of percentage ranges, color-codes, and ranks are provided herein, these are merely to provide context to facilitate understanding of the concepts described, and are not intended to limit the scope of the various embodiments. The computing system may perform different types of operations. As an example, the computing system may repeat the generation of the response to the NL request, the causing of the presentation of the generated response, the generation of the fourth prompt, and the accuracy determinations for each flagged citation and each flagged representation. The computing system may alternatively, or additionally, cause the first reliability indicator for each flagged citation and the second reliability indicator for each flagged representation to be visually highlighted (within the structured object 365). The computing system may alternatively, or additionally, cause warning language (within the structured object 365) for each flagged citation and for each flagged representation to be displayed within the structured object output, the warning language indicating unreliability of flagged citations or representations for which the warning language is displayed.

The order of the steps above may, in some examples, be changed. For instance, after the third AI Model 360a outputs the citations and representations, the citations, representations, and extracted information 350 are input into the fourth prompt 355b. The fourth prompt 355b may cause the fourth AI Model 360b to, for each citation, determine a first accuracy value corresponding to accuracy of said citation based on a comparison of said citation and corresponding cited portion in the cited data item. The fourth prompt 355b may cause the fourth AI Model 360b to generate the first reliability indicator for said citation, based on the first accuracy value for said citation, and to return the first reliability indicator for said citation. Similarly, the fourth prompt 355b may cause the fourth AI Model 360b to, for each representation of the one or more representations of the requested information, determine a second accuracy value corresponding to accuracy of said representation. The determination of the second accuracy value may be based on a comparison of said representation with original language in the corresponding cited portion in the cited data item based on the corresponding citation. The fourth prompt 355b may cause the fourth AI Model 360b to generate the second reliability indicator for said representation, based on the second accuracy value for said representation, and to return the second reliability indicator for said representation. The orchestrator 320 may subsequently generate a prompt to one of the AI Models to generate a structured object 365 that contains at least one of the one or more representations of the requested information, the corresponding one or more citations, the first reliability indicator for each citation, or the second reliability indicator for each of the one or more representations of the requested information. In some cases, the third and fourth prompts 355a and 355b (as well as the third and fourth AI Models 360a and 360b) may be the same, and may perform the functionalities of citation generation, representation generation, citation verification, representation generation, structured object generation, etc., in an iterative manner, with prompt generation resulting in prompts causing the AI Model to perform one step, then the output of that step being used for the input of the next prompt, and so on.

FIG. 3B depicts an example user interface 300B that may be used when implementing confidence enhancement for responses by document-based AI Models. As shown in the example user interface 300B of FIG. 3B, a structured object 375 (similar to structured object 365 in FIG. 3A), may include an NL request field 380, one or more information representation fields 385a, 385b, footnotes 390a, 390b, and one or more reference or citation fields 395a, 395b. In this example, the user is requesting information about the timeline of a project (as shown in the NL request field 380). The system (e.g., computing system and/or orchestrator) or the AI Models return representation of extracted information indicating a summary of information relevant to answering the request (as shown in representation field 385a). The summary of information relevant to answering the request also includes a first footnote 390a within representation field 385a citing the source of information for the summary. The system also returns representation of timeline (in bulletpoint form) in representation field 385b, with a second footnote 390b citing the source of information for the representation of the timeline. In the first reference or citation section 395a corresponding to the first footnote 390a, the source of the information for the summary is displayed, along with a quote of the relevant portions of the extracted document, and a navigation link (in the form of an attachment) to a copy of the source document. In the second reference or citation section 395b corresponding to the second footnote 390b, the source of the information for the timeline is displayed in a collapsed (yet expandable) form. Although a particular example of citation is shown, other examples may be used. For instance, a structured object may be displayed that includes or contains reliability indicators for citations and representations of requested information, and so on. In this manner, by generating citations (and in some cases, reliability indicators for the citations), the issues of hallucinations and misleading or inaccurate representation of source documents and information can be mitigated or avoided. As a result, user confidence in information retrieval and/or extraction can be improved accordingly.

FIG. 4 depicts a block diagram illustrating an example data flow 400 for implementing adverse or malicious input mitigation for AI Models. In the example data flow 400 of FIG. 4, user 405, user interface 415, orchestrator 420, AI Models 430a, 450, and data store(s) 435 may be similar, if not identical, to one of users 160a-160x, user interface 120c, orchestrator 115a or 115b (or computing system 105a-105z), LLMs 130a-130n, and data storage system(s) 150, respectively, of system 100 of FIG. 1. The description of these components of system 100 of FIG. 1 are similarly applicable to the corresponding components of FIG. 4.

To help mitigate against adverse or malicious inputs, the present technology may include pairs of example adverse inputs and proper outputs for those adverse inputs. Such pairs may be referred to as example adverse-input-proper-output pairs. For instance, each of the adverse-input-proper-output pairs includes an example of an adverse input (e.g., malicious, etc.) and an example of a desirable or mitigating output for the adverse input, which may include an output stating that the AI Model cannot produce a response to such an input. The adverse input may correspond to a dialogue state and/or or a single input. For instance, the example adverse inputs may be represented by multiple inputs or turns with an AI Model or chat-based service. In some examples, adverse inputs may include at least one of malicious inputs, adversarial inputs, off-topic inputs, and/or attack vector-based inputs. Herein, "malicious input" may refer to an input that is intended to corrupt or manipulate the AI Model into responding in an undesirable or improper manner (e.g., in a manner that is offensive, inappropriate, prejudicial, and/or emotionally or psychologically harmful to particular individuals or groups of individuals, etc.). Although similar, herein, "adversarial input" may refer to an input that is intended to corrupt or manipulate the AI Model into responding in a manner that is openly confrontational or aggressive and/or a manner that incites violence or promotes conspiracy theories. Although similar, herein, "attack vector-based input" may refer to an input that is intended to corrupt or manipulate the AI Model into operating in a manner that would affect operation of the AI Model (e.g., causing the AI Model to enter into an infinite loop, causing the AI Model to generate programs that are designed to tie up significant amounts of computing and/or network resources, causing the AI Model to generate computer viruses or other malware, causing the AI Model to access other users' information without permission, etc.). Quite differently, "off-topic input" may refer to an input that causes the AI Model to respond in a manner in which the topic of the conversion exchange shifts either chaotically, periodically, or randomly, and in some cases may include flirtations, disjointed speech, or mixing of topics. Each of these inputs is adverse to the intended operation of the AI Model, and thus have been collectively referred to as "adverse inputs." By developing these adverse-input-proper-output pairs and incorporating them into prompts to AI Models, the AI Model is more likely to follow the proper outputs in the example rather than undesirable, improper outputs. The following provides an example of how such adverse-input-proper-output pairs may be integrated into an AI/ML-based system.

With reference to the example data flow 400 of FIG. 4, an orchestrator 420 may receive a natural language ("NL") input 410, from a user 405 via a user interface 415, during a communication session between the user 405 or the user interface 415 and the orchestrator 420. The NL input 410 may include one of many inputs received during a communication session. The orchestrator 420 may then determine a dialogue context which includes the input history where available.

Based on the dialogue context, the orchestrator 420 next determines, or causes the determination, of the adverse-input-proper-output pairs whose inputs are most similar to the inputs in the current dialogue context. This may be performed via a similarity comparison algorithm or via the use of an ML model, such as the first AI Model, as discussed below. Similar to selection of the function-state pairs discussed above, the similarity comparison is performed to determine a subset (e.g., top number) of adverse-input-proper-output pairs to be included in future prompts. The purpose of the adverse-input-proper-output pairs, however, is to prevent improper responses. A similar operation is performed to select non-adverse-input-proper-output pairs whose inputs are most similar to the inputs in the current dialogue context.

As one example of determining the most similar adverse-input-proper-output pairs to the current dialogue context, a first prompt 425 may be generated that includes the current dialogue context, the set of adverse-input-proper-output pairs (and also, in some cases, the set of non-adverse-input-proper-output pairs), and a request to determine the top N number of adverse-input-proper-output pairs (and also, in some cases, the top M number of non-adverse-input-proper-output pairs) whose inputs are most similar to the inputs of the current dialogue context. The orchestrator 420 provides the first prompt 425 that causes a first AI Model 430 to dynamically generate a subset of similar example adverse-input-proper-output pairs 435*a* (and also, in some cases, to dynamically generate a subset of similar example non-adverse-input-proper-output pairs 435*b*) whose inputs are most similar to the inputs of the current dialogue context. In some cases, a plurality of example pairs with adverse input examples 435*a* (and also, in some cases, a plurality of example pairs with non-adverse input examples 435*b*) may be obtained from a data store(s) 435 by the orchestrator 420.

In some examples, example pairs with non-adverse input examples 435*b* includes a plurality of pairs of example dialogue contexts containing non-adverse (i.e., benign or harmless) inputs and example outputs containing non-adverse responses. The set of similar example pairs 440 may include a subset of the example pairs with adverse input examples 435*a* and a subset of the example pairs with non-adverse input examples 435*b* (as denoted in FIG. 4 by the dash-lined arrows between each plurality of example pairs 435*a* and 435*b* and the set of similar example pairs 440). In some cases, further filtering may be performed so that the set of example pairs 435 is of a size that can be included in a subsequent prompt to an AI Model. That is, in the case that the number of example pairs do not fit in the context field of the user interface with the current dialogue context, the orchestrator 420 either may divide the plurality of example pairs 435*a* and/or 435*b* into separate prompts for similarity evaluation or may prompt an AI Model to perform such division into separate prompts for similarity evaluation.

For example, the orchestrator 420 generates a second prompt 445 including the dialogue context and the set of similar example pairs 440, and the request set forth in the NL input (which may be part of the dialogue context). Due to the presence of the example pairs, if the current dialogue context is a malicious or adverse input, a second AI Model 450, to which the second prompt 445 is to be provided, is more likely to produce a proper or mitigating response rather than an improper response. The second prompt 445 is then provided to the second AI Model 450, where the second AI Model 450 processes the prompt and generates result(s) 455. In some examples, the second AI Model 450 may be the same AI Model as the first AI Model 430. In other examples, the second AI Model 450 and the first AI Model 430 may be different AI Models. After receiving the result(s) 455, the orchestrator 420 generates a response to the NL input 410 based on the received result(s) 455, and causes the generated response to be presented, to the user 405 and via the user interface 415, within the communication session. In this manner, by including adverse input mitigation and non-adverse input/response examples, prompt injection attacks or jailbreaking can be mitigated or avoided in an effective and easily expandable and scalable manner.

Additionally, in some examples, the full set of adverse-input-proper-output pairs may be updated or augmented by adding at least one of one or more additional pairs of example dialogue contexts containing adverse inputs and example outputs containing adverse input mitigation responses. In some examples, updating the full set of example adverse-input-proper-output pairs may include, after becoming aware of new adverse input, prompting an AI Model (e.g., the second AI Model 450) to predict mitigation responses for the new adverse input, and adding the new adverse input to the subset of similar example pairs 440.

Also, in some examples, the orchestrator 420 may determine whether the dialogue context contains any adverse inputs either by analyzing the dialogue context to search for any adverse input or by generating a prompt to an AI Model (e.g., the second AI Model 450) that includes the dialogue context and similar example pairs (as generated by the processes described above). The prompt may cause the AI Model to output a determination as to whether the dialogue context contains any adverse inputs. Based on a determination that the dialogue context contains at least one adverse input, the orchestrator 420 may determine effectiveness of adverse input mitigation on the at least one adverse input. Such determination may be made either by analyzing the outputs or result(s) of 455 after performing the adverse input mitigation steps as described in detail above or by generating a prompt to an AI Model (e.g., the second AI Model 450) that includes the result(s) 455, the dialogue context, and the similar example pairs 440. The prompt may cause the AI Model to perform such analysis and/or determination to output results (e.g., result(s) 455) to indicate whether or not (and/or to what degree) the adverse input mitigation is effective. One or more messages may then be generated, either by the orchestrator 420 or by the AI Model (e.g., the second AI Model 450 based on prompts generated by the orchestrator 420). The one or more messages may indicate presence (or absence) of one or more adverse inputs and/or may indicate effectiveness of adverse input mitigation on any adverse input.

Figure 5:
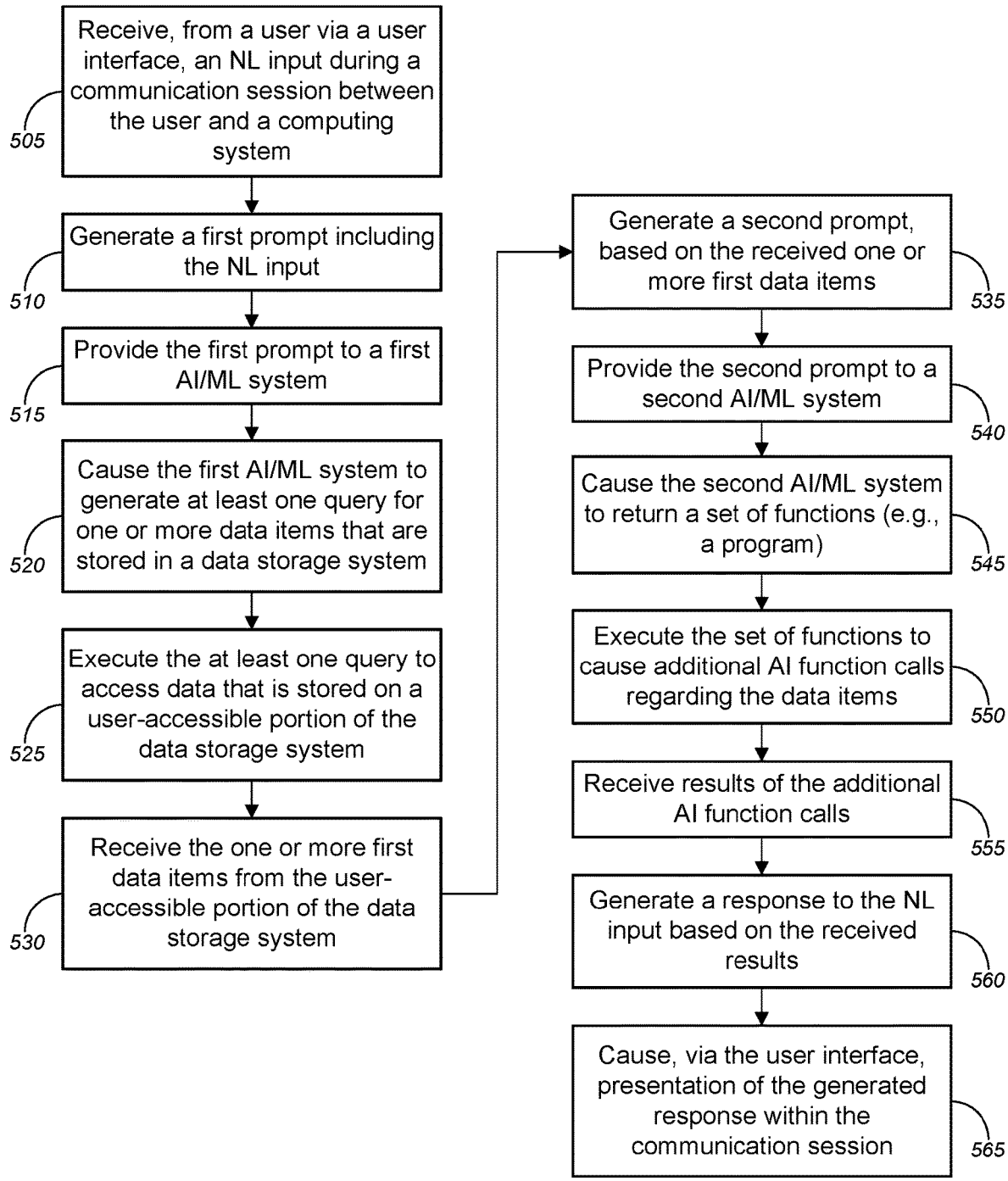
FIG. 5 depicts an example method for implementing conversational AI/ML-based user tenant orchestration.

FIG. 5 depicts an example method 500 for implementing conversational AI/ML-based user tenant orchestration. While the techniques and procedures are depicted and/or described in a certain order for purposes of illustration, it should be appreciated that certain procedures may be reordered and/or omitted within the scope of various embodiments. The operations of method 500 may be performed by one or more computing devices, such as the devices discussed in the various systems above. In some examples, the operations of method 500 are performed by the computing device operating as the orchestrator.

At operation 505, a computing system receives, from a user via a user interface, a natural language ("NL") input during a communication session between the user and the computing system. In some examples, the computing system includes at least one of an orchestrator, a chat interface system, a human interface system, an information access device, a server, an artificial intelligence ("AI") and/or machine learning ("ML") system, a cloud computing system, or a distributed computing system. In some cases, the communication session includes one of a chat session, a voice-only session, a telephone communication session, a video communication session, a multimedia communication session, a virtual reality ("VR")-based communication session, an augmented reality ("AR")-based communication session, or a mixed reality ("MR")-based communication session. In some examples, the NL input includes one of NL text input or NL voice input.

At operation 510, the computing system generates a first prompt including the NL input. At operation 515, the first prompt is provided to a first AI/ML-based system or first AI Model. The first AI Model processes and generates outputs based on the first prompt. In some cases, the first prompt may cause the first AI Model to generate the at least one query for the one or more data items that are stored in a data storage system (at operation 520). In some examples, the one or more data items includes at least one of one or more documents, calendar events, chat messages, email messages, structured database records, and/or contacts, among other types of data items.

At operation 525, the query is executed to access data that is stored on a portion of the data storage system, the portion being accessible by the user. At operation 530, the computing system receives the one or more data items from the user-accessible portion of the data storage system. The computing system, at operation 535, generates a second prompt, based on the received one or more data items. The second prompt is provided to a second AI/ML-based system or second AI Model, at operation 540. The second AI Model processes and generates a program based on the second prompt. In some cases, the second prompt may cause the second AI Model to return a program with a set of functions with corresponding sets of arguments, which is received in operation 545.

At operation 550, the functions in the program are executed according to the arguments of the functions. Execution of the functions may cause additional AI Model calls to be made to determine information about the data items that were received in operation 530. The results from the AI Model calls are received in operation 555. At operation 560, a response to the NL input is generated based on the received results in operation 555. At operation 565, the generated response is caused to be presented in the communication session via the user interface. Other operations for conversational AI/ML-based user tenant orchestration are described above with respect to FIGS. 2A-2C.

FIGS. 6A and 6B depict an example method 600 for implementing confidence enhancement for responses by document-based AI Models. While the techniques and procedures are depicted and/or described in a certain order for purposes of illustration, it should be appreciated that certain procedures may be reordered and/or omitted within the scope of various embodiments. The operations of method 600 may be performed by one or more computing devices, such as the devices discussed in the various systems above. In some examples, the operations of method 600 are performed by the computing device operating as the orchestrator.

At operation 602, an NL request to extract information from a data storage system is received, from a user via a user interface, during a communication session between the user and a computing system. In some examples, the computing system includes at least one of an orchestrator, a chat interface system, a human interface system, an information access device, a server, an AI/ML system, a cloud computing system, or a distributed computing system. In some cases, the communication session includes one of a chat session, a voice-only session, a telephone communication session, a video communication session, a multimedia communication session, a VR-based communication session, an AR-based communication session, or a MR-based communication session. In some examples, the NL input includes corresponding one of NL text input, NL voice input, or NL sign language input.

At operation 604, the computing system generates a first prompt including the NL input. At operation 606, the first prompt is provided to a first AI/ML-based system or first AI Model. The first AI Model processes and generates outputs (e.g., at least one query for one or more data items that are stored in a data storage system) based on the first prompt. In some cases, the first prompt may cause the first AI Model to generate the at least one query for the one or more data items that are stored in the data storage system (at operation 608). The at least one query may then be executed to access data that is stored on the data storage system (at operation 610).

At operation 612, the one or more data items are received from the data storage system. At operation 614, the computing system generates a second prompt, based on the received one or more data items. The second prompt is provided to a second AI/ML-based system or second AI Model, at operation 616. The second AI Model processes and generates outputs based on the second prompt. In some cases, the second prompt may cause the second AI Model to return at least one function (e.g., a program) (at operation 618). The computing system or other device executes the at least one function call to extract the requested information from the received one or more data items (at operation 620). At operation 622, the computing system generates a third prompt, based on the extracted information. The third prompt is provided to a third AI/ML-based system or third AI Model, at operation 624. The third AI Model processes and generates outputs based on the third prompt. In some cases, the third prompt may cause the third AI Model to generate a structured object including one or more citations, at block 626.

The output of the third AI Model also includes citations for the statements or assertions within the output. For instance, the third prompt includes examples and/or instructions that cause the output to include citations for the answers or statements provided in the output. In such examples, the structured object that is generated includes the results and citations in a particular format, such as in a footnote format. In some examples, the one or more citations may include one or more of a citation to each data item or a citation to each portion of each data item, from which the requested information or portions of the requested information were extracted.

In some examples, method 600 may continue to operation 628. In other examples, method 600 may continue onto the process at operation 632 in FIG. 6B following the circular marker denoted, "A," before returning to the process at operation 626 or at operation 628 in FIG. 6A, as indicated by the circular marker denoted, "B."

At operation 628, the computing system generates a response to the NL request, the response including one or more representations of the requested information and the corresponding one or more citations within the structured object. In some examples, the structured object is a user interface construct that is displayed within the user interface or the communication session. The structured object contains or presents one or more displayed information and the corresponding one or more citations. In some cases, the one or more displayed information may include at least one of the answer object (e.g., answer string), the summary of the requested information, or one or more quoted portions. The corresponding one or more citations may include text-only citation or text citation together with the navigation link to the cited portion of the data item or the cited portion of the portion of the data item. In some cases, the corresponding one or more citations may be displayed as one or more footnotes within the structured object (such as shown in FIG. 3B). The computing system, at operation 630, causes the structured object to be presented, within the communication session, to the user and via the user interface. In some examples, method 600 may continue onto the process at operation 632 in FIG. 6B following the circular marker denoted, "A," before returning to the process at operation 626 or at operation 628 in FIG. 6A, as indicated by the circular marker denoted, "B."

At operation 632 in FIG. 6B (following the circular marker denoted, "A," from FIG. 6A), the computing system may generate a fourth prompt. The fourth prompt may include purported information (in the output from the third AI Model) extracted from the data item and corresponding citation among the one or more citations, and the one or more data items. The fourth prompt may be provided to a fourth AI/ML-based system or fourth AI Model, at operation 634. The fourth AI Model processes and generates outputs (e.g., determine accuracy of citations and representations of requested information) based on the fourth prompt. In some cases, the fourth prompt may cause the fourth AI Model to determine, for each citation, accuracy of said citation, and to return a first accuracy value corresponding to the determined accuracy of said citation (at operation 636). In some examples, accuracy of each citation may be determined based on a comparison of said citation and corresponding cited portion in the cited data item. Similarly, the fourth prompt may cause the fourth AI Model to determine, for each representations of the requested information, accuracy of said representation, and to return a second accuracy value corresponding to the determined accuracy of said representation (at operation 638). In some examples, accuracy of each representation may be determined based on a comparison of said representation and corresponding cited portion in the cited data item.

In some examples, at operation 640, each citation whose first accuracy values are each below a first threshold amount (e.g., 50, 60, 70, or 80% likelihood of being accurate, or a range of accuracy percentages between 50 and 80%) may be flagged. Likewise, at operation 642, each representation whose second accuracy values are each below a second threshold amount (e.g., 50, 60, 70, or 80% likelihood of being accurate, or a range of accuracy percentages between 50 and 80%) may be flagged. In some cases, the first and second threshold amounts may be set to be the same. In other cases, the first and second threshold amounts may be different from each other.

At operation 644, a first reliability indicator may be generated for each citation, based on the returned first accuracy value. Each generated first reliability indicator may be displayed within the structured object, in a manner that is visually coupled to corresponding each citation (at operation 646). Likewise, at operation 648, a second reliability indicator may be generated for each representation of the requested information, based on the returned second accuracy value. Each generated second reliability indicator may be displayed within the structured object, in a manner that is visually coupled to corresponding each representation (at operation 650).

At operation 652, at least one set of tasks may be performed. As an example, the computing system may repeat the generation of the structured object including the one or more citations (at operation 626), the generation of the response to the NL request (at operation 628), the causing of the presentation of the generated response (at operation 630), the generation of the fourth prompt (at operation 632), and the accuracy determinations for each flagged citation (at operation 636) and each flagged representation (at operation 638). The computing system may alternatively, or additionally, visually highlight (within the structured object) the first reliability indicator for each flagged citation, and similarly visually highlight the second reliability indicator for each flagged representation. The computing system may alternatively, or additionally, display warning language (within the structured object) for each flagged citation and for each flagged representation, the warning language indicating unreliability of flagged citations or representations for which the warning language is displayed.

Method 600 may return to the process at operation 626 or at operation 628 in FIG. 6A, as indicated by the circular marker denoted, "B." Other operations for confidence enhancement for responses by document-based AI Models are described above with respect to FIG. 3.

FIG. 7 depicts an example method 700 for implementing adverse or malicious input mitigation for AI Models. While the techniques and procedures are depicted and/or described in a certain order for purposes of illustration, it should be appreciated that certain procedures may be reordered and/or omitted within the scope of various embodiments. The operations of method 700 may be performed by one or more computing devices, such as the devices discussed in the various systems above. In some examples, the operations of method 700 are performed by the computing device operating as the orchestrator.

At operation 705, a computing system receives, via a user interface, an NL input during a communication session between the user interface and the computing system. In some examples, the computing system includes at least one of an orchestrator, a chat interface system, a human interface system, an information access device, a server, an AI/ML system, a cloud computing system, or a distributed computing system. In some cases, the communication session includes one of a chat session, a voice-only session, a telephone communication session, a video communication session, a multimedia communication session, a VR-based communication session, an AR-based communication session, or an MR-based communication session. In some examples, the NL input includes corresponding one of NL text input, NL voice input, or NL sign language input.

At operation 710, the computing system (dynamically) identifies or generates a subset of pairs of example adverse dialogue contexts and example proper outputs (as well as a subset of pairs of example non-adverse dialogue contexts and example proper outputs) whose inputs or dialogue contexts are similar to (the inputs of) the current dialogue context. The pairs of example adverse dialogue contexts and example proper outputs may be the example adverse-input-proper-output pairs discussed above. Likewise, the pairs of example non-adverse dialogue contexts and example proper outputs may be the example non-adverse-input-proper-output pairs discussed above. Determining the subset of similar pairs may be performed through the use of ML algorithms or other matching or similarity comparison algorithms. For instance, the current dialogue context may be compared to the inputs of the full set of example adverse-input-proper-output pairs (as well as the full set of example non-adverse-input-proper-output pairs), and the example adverse-input-proper-output pairs (and the example non-adverse-input-proper-output pairs) whose inputs are most similar are included in the subset of similar example pairs. At operation 715, in examples where the subset of example pairs is generated from a separate model, the dynamically identified or generated subset of similar example pairs is received.

At operation 720, a prompt is generated that includes the current dialogue context as well as the subset of similar example pairs. The prompt is provided to an AI Model, at operation 725. The prompt may also include a request or other instructions based on the NL input received at operation 705. The AI Model then processes the prompt and returns an output that is received at operation 730. Due to the inclusion of the subset of example adverse-input-proper-output pairs and the subset of example non-adverse-input-proper-output pairs, the output of the AI Model is less likely to produce an improper response to a malicious input.

The computing system may generate a response to the NL input based on the received output (at operation 735) and may cause the generated response to be presented, via the user interface, within the communication session (at operation 740). Other operations for adverse or malicious input mitigation for AI Models are described above with respect to FIG. 4.

Figure 8:
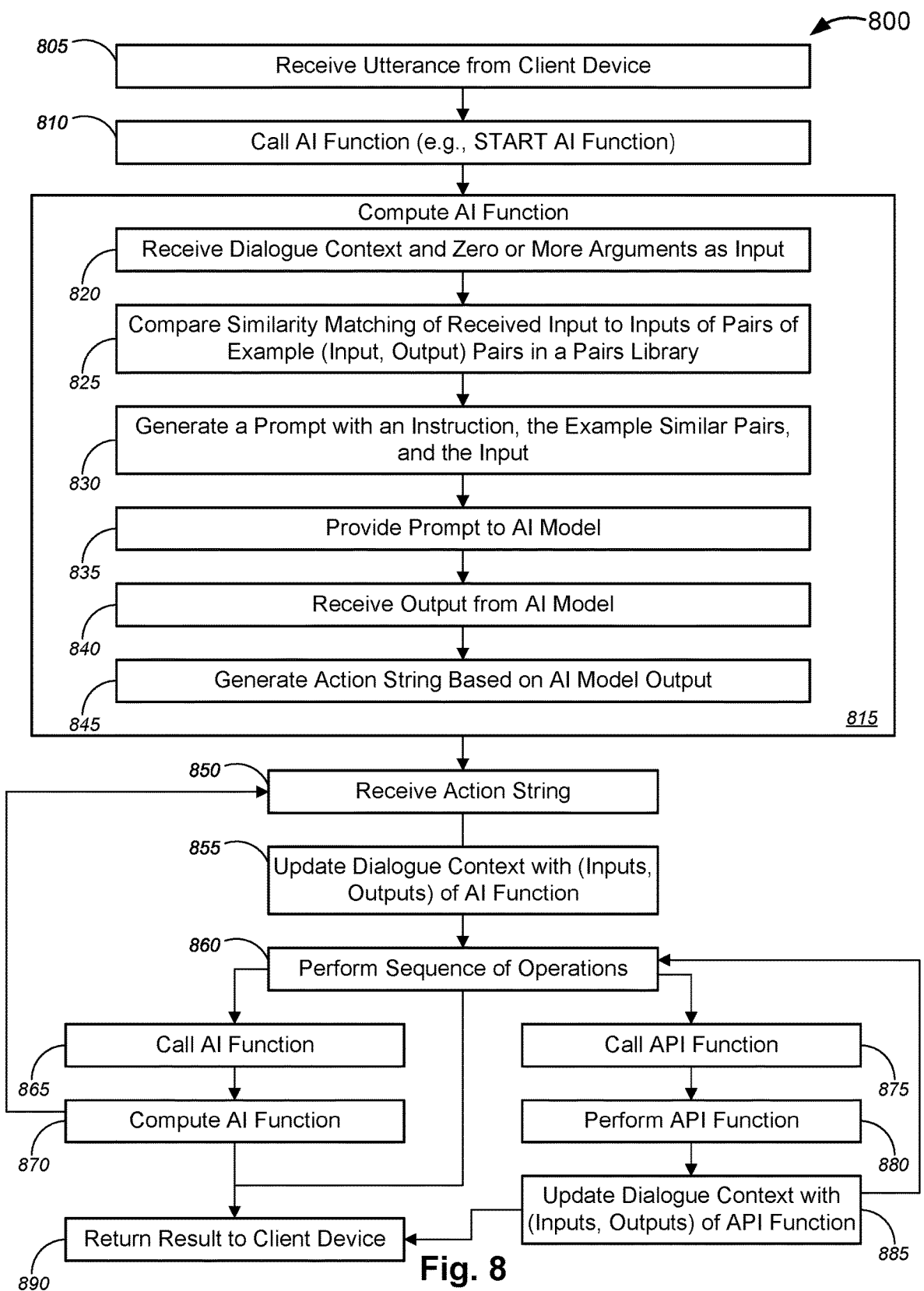
FIG. 8 depicts another example method for implementing conversational AI/ML-based user tenant orchestration.

FIG. 8 depicts another example method 800 for implementing conversational AI/ML-based user tenant orchestration. While the techniques and procedures are depicted and/or described in a certain order for purposes of illustration, it should be appreciated that certain procedures may be reordered and/or omitted within the scope of various embodiments. The operations of method 800 may be performed by one or more computing devices, such as the devices discussed in the various systems above. In some examples, the operations of method 800 are performed by the computing device operating as the orchestrator.

At operation 805, a computing system receives an utterance from a client device, in some cases, via a user interface (as described above). As described above, the utterance may include one of an NL text input, an NL voice input, or an NL sign language input. In some examples, the computing system includes at least one of an orchestrator, a chat interface system, a human interface system, an information access device, a server, an AI/ML system, a cloud computing system, or a distributed computing system.

At operation 810, the computing system calls an AI function (e.g., a START AI function). The computing system computes the AI function, at operation 815. Computing the AI function may include performing operations 820-845. At operation 820, the computing system receives dialogue context and zero or more arguments as input. At operation 825, the computing system compares similarity matching (or performs similarity evaluation) of received input to inputs of pairs of example (input, output) pairs that are stored in the pairs library (e.g., context-response pairs library 296 of FIG. 2C) to output a subset of similar example pairs. At operation 830, the computing system generates a prompt with the received input in the utterance, the subset of similar example pairs, and an NL instruction relating the predicted output string to the received input. At operation 835, the computing system provides a prompt to an AI model, and receives, at operation 840, output from the AI model. At operation 845, the computing system generates an action string based on the AI model output.

At operation 850, the computing system receives the action string, and, at operation 855, updates a dialogue context with (inputs, outputs) of the AI function. At operation 860, the computing system performs a sequence of operations defined in the action string. The sequence of operations may include calling another AI function (at operation 865), calling an API function 875, and/or returning a result to the client device in operation 890. Where the AI function is called in operation 865, the AI function is computed at operation 870 to produce a new action string. The computing system may receive the new action string (at operation 850) in the case that computing the AI function (at operation 870) results in generating another action string (as described, e.g., at operations 830-845 or at operations 815-845, etc.), which would repeat processes at operation 860 and the following operations. Alternatively or additionally, the computing system may return a result(s) to the client device (at operation 890). In some examples, the sequence of operations includes calling an API function (at operation 875) and performing the API function (at operation 880). Alternatively or additionally, the computing system may update a dialogue context with (inputs, outputs) of the API function (at operation 885). In some examples, the computing system may perform the sequence of operations (at operation 860) in the case that performing the API function (at operation 880) causes the computing system to repeat the process at operation 860 and the following operations. In some cases, after updating the dialogue context, the computing system may return a result(s) to the client device (at operation 890). In some examples, the sequence of operations includes directly returning the result(s) to the client device (at operation 890) without further calling an AI function (at operation 865) or calling an API function (at operation 875).

When implementing an AI function using an LM, an output string is returned. However, if other types of ML models are used, then the output that is returned may be a string or a non-string data structure, which may be similar to the structured data output returned by an API function, as described above. In cases where the output that is returned is a non-string data structure, the operations 845 and 850 that are related to an action string may be bypassed, with the sequence of operations being based on the output at operation 840 alone. Other operations for conversational AI/ML-based user tenant orchestration are described above with respect to FIGS. 2A-2C and/or FIG. 5.

While the techniques and procedures in methods 500, 600, 700, and 800 are depicted and/or described in a certain order for purposes of illustration, it should be appreciated that certain procedures may be reordered and/or omitted within the scope of various embodiments. Moreover, while the methods 500, 600, 700, and 800 may be implemented by or with (and, in some cases, are described below with respect to) the systems, examples, or embodiments 100, 200A, 200B, 200C, 300A, 300B, and 400 of FIGS. 1, 2A, 2B, 2C, 3A, 3B, and 4, respectively (or components thereof), such methods may also be implemented using any suitable hardware (or software) implementation. Similarly, while each of the systems, examples, or embodiments 100, 200A, 200B, 200C, 300A, 300B, and 400 of FIGS. 1, 2A, 2B, 2C, 3A, 3B, and 4, respectively (or components thereof), can operate according to the methods 500, 600, 700, and 800 (e.g., by executing instructions embodied on a computer readable medium), the systems, examples, or embodiments 100, 200A, 200B, 200C, 300A, 300B, and 400 of FIGS. 1, 2A, 2B, 2C, 3A, 3B, and 4 can each also operate according to other modes of operation and/or perform other suitable procedures.

Figure 9:
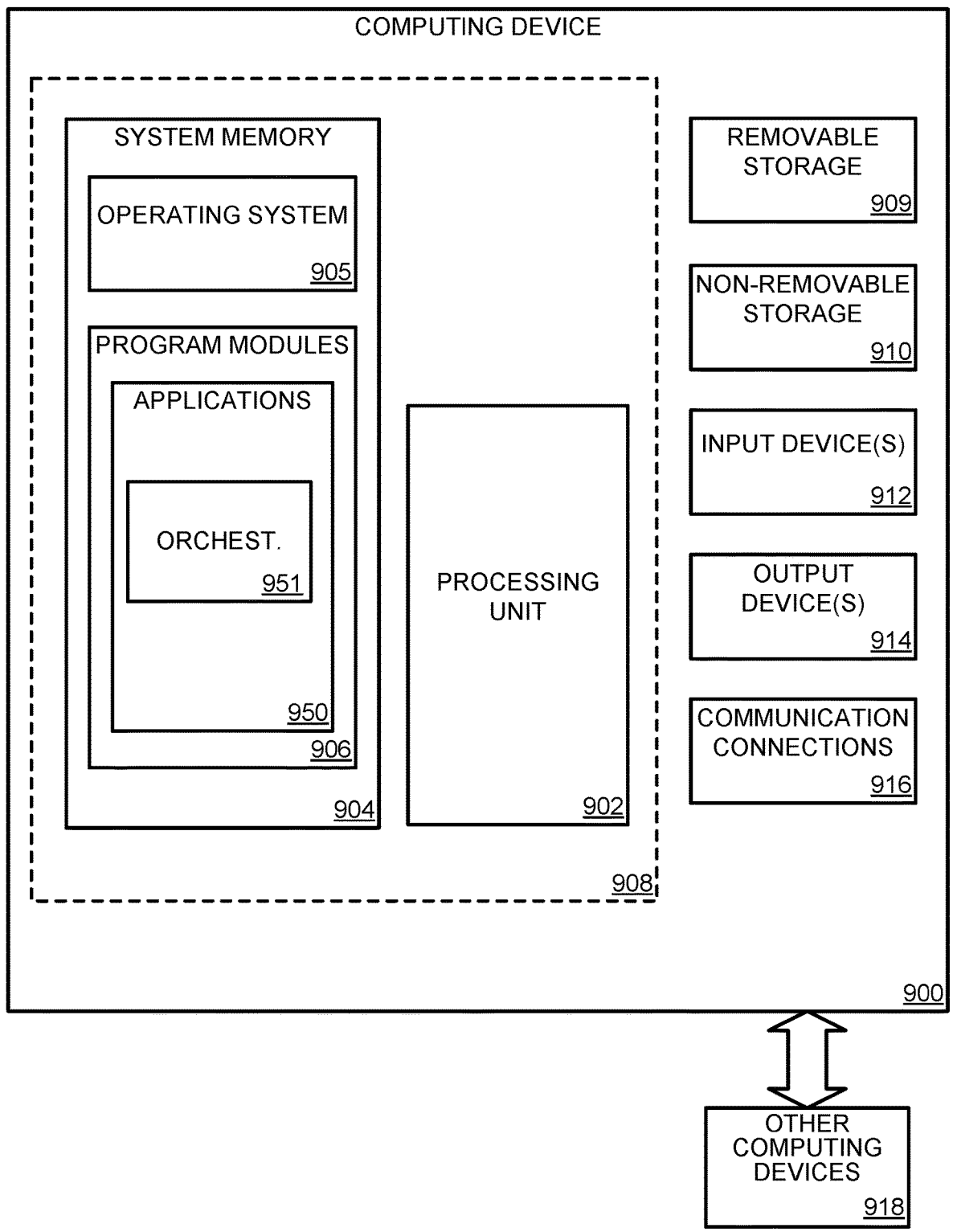
FIG. 9 depicts a block diagram illustrating example physical components of a computing device with which aspects of the technology may be practiced.

FIG. 9 is a block diagram illustrating physical components (i.e., hardware) of a computing device 900 with which examples of the present disclosure may be practiced. The computing device components described below may be suitable for a client device implementing at least one of conversational AI/ML-based user tenant orchestration, confidence enhancement for responses by document-based AI Models, and/or adverse or malicious input mitigation for AI Models, as discussed above. In a basic configuration, the computing device 900 may include at least one processing unit 902 and a system memory 904. The processing unit(s) (e.g., processors) may be referred to as a processing system. Depending on the configuration and type of computing device, the system memory 904 may include, but is not limited to, volatile storage (e.g., random access memory), non-volatile storage (e.g., read-only memory), flash memory, or any combination of such memories. The system memory 904 may include an operating system 905 and one or more program modules 906 suitable for running software applications 950, such as orchestration applications 951, to implement one or more of the systems or methods described above.

The operating system 905, for example, may be suitable for controlling the operation of the computing device 900. Furthermore, aspects of the invention may be practiced in conjunction with a graphics library, other operating systems, or any other application program and is not limited to any particular application or system. This basic configuration is illustrated in FIG. 9 by those components within a dashed line 908. The computing device 900 may have additional features or functionalities. For example, the computing device 900 may also include additional data storage devices (which may be removable and/or non-removable), such as, for example, magnetic disks, optical disks, or tape, etc. Such additional storage is illustrated in FIG. 9 by a removable storage device(s) 909 and a non-removable storage device(s) 910.

As stated above, a number of program modules and data files may be stored in the system memory 904. While executing on the processing unit 902, the program modules 906 may perform processes including, but not limited to, one or more of the operations of the method(s) as illustrated in FIGS. 5-8, or one or more operations of the system(s) and/or apparatus(es) as described with respect to FIGS. 1-4, or the like. Other program modules that may be used in accordance with examples of the present invention may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip ("SOC") where each or many of the components illustrated in FIG. 9 may be integrated onto a single integrated circuit. Such an SOC device may include one or more processing units, graphics units, communications units, system virtualization units and various application functionalities all of which may be integrated (or "burned") onto the chip substrate as a single integrated circuit. When operating via an SOC, the functionality, described herein, with respect to generating suggested queries, may be operated via application-specific logic integrated with other components of the computing device 900 on the single integrated circuit (or chip). Examples of the present disclosure may also be practiced using other technologies capable of performing logical operations such as, for example, AND, OR, and NOT, including, but not limited to, mechanical, optical, fluidic, and/or quantum technologies.

The computing device 900 may also have one or more input devices 912 such as a keyboard, a mouse, a pen, a sound input device, and/or a touch input device, etc. The output device(s) 914 such as a display, speakers, and/or a printer, etc. may also be included. The aforementioned devices are examples and others may be used. The computing device 900 may include one or more communication connections 916 allowing communications with other computing devices 918. Examples of suitable communication connections 916 include, but are not limited to, radio frequency ("RF") transmitter, receiver, and/or transceiver circuitry; universal serial bus ("USB"), parallel, and/or serial ports; and/or the like.

The term "computer readable media" as used herein may include computer storage media. Computer storage media may include volatile and nonvolatile, and/or removable and non-removable, media that may be implemented in any method or technology for storage of information, such as computer readable instructions, data structures, or program modules. The system memory 904, the removable storage device 909, and the non-removable storage device 910 are all computer storage media examples (i.e., memory storage). Computer storage media may include RAM, ROM, electrically erasable programmable read-only memory ("EEPROM"), flash memory or other memory technology, CD-ROM, digital versatile disks ("DVD") or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media may be non-transitory and tangible, and does not include a carrier wave or other propagated data signal.

Communication media may be embodied by computer readable instructions, data structures, program modules, or other data in a modulated data signal, such as a carrier wave or other transport mechanism, and may include any information delivery media. The term "modulated data signal" may describe a signal that has one or more characteristics that are set or changed in such a manner as to encode information in the signal. By way of example, and not limitation, communication media may include wired media such as a wired network or direct-wired connection, and wireless media such as acoustic, RF, infrared, and other wireless media.

As should be appreciated from the foregoing, the present technology provides multiple technical benefits and solutions to technical problems. For instance, search and access of information from user-specific data items stored information sources have continued to explode in size and scope generally raises technical problems in terms of increasing cumbersomeness and ineffectiveness in implementation of such search and access. This technical problem is amplified in multitenancy contexts in which siloed or scoped access is combined with the search and access functionalities. The present technology provides for search and access of data items from user-accessible portions of a data storage system, based on NL inputs from the user, where additional AI Models are used to execute further AI functions on the accessed data items. With the use of AI Models, the problems of hallucinations and of adverse or malicious inputs become prevalent. The present technology includes use of AI Models to generate citations to extracted information from data items and, in some cases, to verify the extracted information and/or citations, which may be caused to be presented or displayed in a structured object within a context field of an AI Model user interface. The present technology also includes use of AI Models to generate a subset of example pairs by filtering example pairs of dialogue context responses that contain non-adverse inputs and outputs or that contain adverse inputs and output, based on similarity evaluation. The generated subset of example pairs when input as part of the prompt for an AI Model enables the AI Model to follow the non-adverse examples or mitigation responses. The citation-based technology addresses or mitigates the hallucination issues, while the subsets of example-pairs-based technology addresses or mitigates the adverse or malicious input issues.

In an aspect, the technology relates to a system for implementing confidence enhancement for responses by document-based artificial intelligence ("AI") and/or machine learning ("ML") models. The system includes a computing system, including at least one processor; and a computer storage medium communicatively coupled to the at least one processor. The computer storage medium stores instructions that, when executed by the at least one processor, causes the computing system to perform operations including generating a first prompt requesting information about one or more data items, based on a natural language ("NL") request that is received via a user interface. The operations further include providing the first prompt to an AI/ML-based system, the first prompt causing the AI/ML-based system to generate a structured object output. The structured object output includes the requested information from the one or more data items and one or more citations. The one or more citations include one or more of a citation to each data item or a citation to each portion of each data item, from which the requested information or portions of the requested information were extracted. The operations also include generating a response to the NL request, the response including one or more representations of the requested information and the corresponding one or more citations. The operations further include causing, via the user interface, presentation of the generated response within a communication session between the user interface and the computing system.

In some examples, the computing system includes at least one of an orchestrator, a chat interface system, a human interface system, an information access device, a server, an AI/ML system, a cloud computing system, or a distributed computing system. In some cases, the communication session includes one of a chat session, a voice-only session, a telephone communication session, a video communication session, a multimedia communication session, a virtual reality ("VR")-based communication session, an augmented reality ("AR")-based communication session, or a mixed reality ("MR")-based communication session. The NL request includes corresponding one of NL text request, NL voice request, or NL sign language request. In some examples, the one or more data items include at least one of one or more documents, calendar events, chat messages, email messages, structured database records, or contacts.

According to some embodiments, each citation among the one or more citations as presented in the generated response within the communication session includes one of a text-only citation or a text citation together with a navigation link. The navigation link is to a cited portion of the data item or to a cited portion of the portion of the data item from which each corresponding requested information or each corresponding portion of the requested information was extracted. In some cases, the one or more representations of the requested information each includes at least one of an answer object containing the requested information, a summary of the requested information, or one or more quoted portions of at least one data item of the one or more data items containing the requested information.

In some examples, the generated response as presented within the communication session includes the structured object output that contains one or more displayed information and the corresponding one or more citations. The one or more displayed information include at least one of the answer object, the summary of the requested information, or the one or more quoted portions. The corresponding one or more citations include the one of the text-only citation or the text citation together with the navigation link to the cited portion of the data item or the cited portion of the portion of the data item. The structured object output is a user interface construct that is displayed within the communication session and that presents the one or more displayed information and the corresponding one or more citations. The corresponding one or more citations are displayed as one or more footnotes within the structured object output.

In some examples, the operations further include generating a second prompt, the second prompt including each extracted information and corresponding citation among the one or more citations, and the one or more data items; and providing the second prompt to a second AI/ML-based system. The second prompt causes the second AI/ML-based system to, for each citation, determine accuracy of said citation based on a comparison of said citation and corresponding cited portion in the cited data item, and return a first accuracy value corresponding to the determined accuracy of said citation. The second prompt further causes the second AI/ML-based system to, for each of the one or more representations of the requested information, determine accuracy of said representation based on a comparison of said representation with original language in the corresponding cited portion in the cited data item based on the corresponding citation, and return a second accuracy value corresponding to the determined accuracy of said representation.

In some examples, the operations further include generating a first reliability indicator for each citation, based on the returned first accuracy value; and causing each generated first reliability indicator to be displayed, within the structured object output, visually coupled to corresponding each citation. The operations further include generating a second reliability indicator for each of the one or more representations of the requested information, based on the returned second accuracy value; and causing each generated second reliability indicator to be displayed, within the structured object output, visually coupled to corresponding each of the one or more representations of the requested information. The first reliability indicator and the second reliability indicator each includes at least one of a text field containing a percentage value representing a corresponding accuracy value, a graphic field containing a graphical representation of the percentage value, or a graphic field containing color-coded graphics each corresponding to a sub-range within a spectrum of the percentage value.

In some examples, the operations further include: flagging each citation, among the one or more citations, whose first accuracy values are each below a first threshold amount; and flagging each representation, among the one or more representations of the requested information, whose second accuracy values are each below a second threshold amount. The operations further include repeating the generation of the structured object output, the generation of the response to the NL request, the causing of the presentation of the generated response, the generation of the second prompt, and the accuracy determinations for each flagged citation and each flagged representation. The operations alternatively or additionally, include causing the first reliability indicator for each flagged citation and the second reliability indicator for each flagged representation to be visually highlighted. The operations alternatively or additionally, include causing warning language for each flagged citation and for each flagged representation to be displayed within the structured object output, the warning language indicating unreliability of flagged citations or representations for which the warning language is displayed.

In another aspect, the technology relates to a computer-implemented method for implementing confidence enhancement for responses by document-based artificial intelligence ("AI") and/or machine learning ("ML") models. The method includes, after receiving, via a user interface, a natural language ("NL") request to extract information from a data storage system, and in response to receiving one or more data items after at least one query has been executed to access data associated with the request, performing, by a computing system, operations. The operations include generating a first prompt, based on the received one or more data items; providing the first prompt to a first AI/ML-based system, the first prompt causing the first AI/ML-based system to return at least one AI function; and executing the at least one AI function to extract the requested information from the received one or more data items. The operations further include generating a second prompt, based on the extracted requested information; and providing the second prompt to a second AI/ML-based system. The second prompt causes the second AI/ML-based system to include one or more citations. The one or more citations include one or more of a citation to each data item or a citation to each portion of each data item, from which the requested information or portions of the requested information were extracted. The operations further include generating a response to the NL request. The response includes a structured object, and one or more representations of the requested information and corresponding citation among the one or more citations being contained within the structured object. The operations include causing, via the user interface, presentation of the structured object within a communication session between the user interface and the computing system. The structured object displays the one or more representations of the requested information as at least one of an answer object containing the requested information, a summary of the requested information, or one or more quoted portions of at least one data item of the one or more data items containing the requested information. The structured object displays each citation among the one or more citations as a text citation together with a navigation link to a cited portion of the data item or a cited portion of the portion of the data item from which each corresponding requested information or each corresponding portion of the requested information was extracted.

In some examples, each citation is displayed, within the structured object, as a footnote. In some examples, the computing system generates a third prompt, the third prompt including each extracted information and corresponding citation among the one or more citations, and the one or more data items; and provides the third prompt to a third AI/ML-based system. The third prompt causes the third AI/ML-based system to, for each citation, determine accuracy of said citation based on a comparison of said citation and corresponding cited portion in the cited data item, and return a first accuracy value corresponding to the determined accuracy of said citation. The third prompt causes the third AI/ML-based system to, for each of the one or more representations of the requested information, determine accuracy of said representation based on a comparison of said representation with original language in the corresponding cited portion in the cited data item based on the corresponding citation, and return a second accuracy value corresponding to the determined accuracy of said representation.

In some examples, the computing system generates a first reliability indicator for each citation, based on the returned first accuracy value; and causes each generated first reliability indicator to be displayed, within the structured object, visually coupled to corresponding each citation. The computing system generates a second reliability indicator for each of the one or more representations of the requested information, based on the returned second accuracy value; and causes each generated second reliability indicator to be displayed, within the structured object, visually coupled to corresponding each of the one or more representations of the requested information. The first reliability indicator and the second reliability indicator each includes at least one of a text field containing a percentage value representing a corresponding accuracy value, a graphic field containing a graphical representation of the percentage value, or a graphic field containing color-coded graphics each corresponding to a sub-range within a spectrum of the percentage value.

In yet another aspect, the technology relates to a system for implementing confidence enhancement for responses by document-based artificial intelligence ("AI") and/or machine learning ("ML") models. The system includes a computing system, including at least one processor; and a computer storage medium communicatively coupled to the at least one processor. The computer storage medium stores instructions that, when executed by the at least one processor, causes the computing system to perform operations including, after receiving, via a user interface, a natural language ("NL") request to extract information from a data storage system, and in response to receiving one or more data items after at least one query has been executed to access data associated with the request, performing operations. The operations include generating a first prompt, based on the received one or more data items; and providing the first prompt to a first AI/ML-based system. The first prompt causes the first AI/ML-based system to return at least one function. The operations further include executing the at least one function to extract the requested information from the received one or more data items. The operations further include generating a second prompt, based on the extracted requested information; and providing the second prompt to a second AI/ML-based system, the second prompt causing the second AI/ML-based system to include one or more citations. The one or more citations include one or more of a citation to each data item or a citation to each portion of each data item, from which the requested information or portions of the requested information were extracted. The operations further include generating one or more representations of the requested information; generating a third prompt, the third prompt including each extracted information and corresponding citation among the one or more citations, and the one or more data items; and generating a response to the NL request. The response includes the one or more representations of the requested information, the corresponding one or more citations, a first reliability indicator for each citation, and a second reliability indicator for each of the one or more representations of the requested information. The operations further include causing, via the user interface, presentation of the generated response within a communication session between the user and the computing system. The generated response as presented within the communication session displays each generated first reliability indicator visually coupled to corresponding each citation and displays each generated second reliability indicator visually coupled to corresponding each of the one or more representations of the requested information.

In some examples, each citation is displayed, within the structured object output, as a footnote. In some examples, the operations further include providing the third prompt to a third AI/ML-based system. The third prompt causes the third AI/ML-based system to, for each citation, determine a first accuracy value corresponding to accuracy of said citation based on a comparison of said citation and corresponding cited portion in the cited data item; generate the first reliability indicator for said citation, based on the first accuracy value for said citation; and return the first reliability indicator for said citation. The third prompt causes the third AI/ML-based system to, for each representation of the one or more representations of the requested information, determine a second accuracy value corresponding to accuracy of said representation based on a comparison of said representation with original language in the corresponding cited portion in the cited data item based on the corresponding citation; generate the second reliability indicator for said representation, based on the second accuracy value for said representation; and return the second reliability indicator for said representation.

In some examples, the first reliability indicator and the second reliability indicator each includes at least one of a text field containing a percentage value representing a corresponding accuracy value, a graphic field containing a graphical representation of the percentage value, or a graphic field containing color-coded graphics each corresponding to a sub-range within a spectrum of the percentage value. In some examples, the operations further include flagging each citation, among the one or more citations, whose first accuracy values are each below a first threshold amount; and flagging each representation, among the one or more representations of the requested information, whose second accuracy values are each below a second threshold amount. The operations further include repeating the generation of the response to the NL request, the causing of the presentation of the generated response, the generation of the second prompt, and the accuracy determinations for each flagged citation and each flagged representation. The operations further include, alternatively or additionally, causing the first reliability indicator for each flagged citation and the second reliability indicator for each flagged representation to be visually highlighted. The operations further include, alternatively or additionally, causing warning language for each flagged citation and for each flagged representation to be displayed within the structured object output, the warning language indicating unreliability of flagged citations or representations for which the warning language is displayed. In some examples, the generated response as presented within the communication session includes a structured object that contains at least one of the one or more representations of the requested information, the corresponding one or more citations, the first reliability indicator for each citation, or the second reliability indicator for each of the one or more representations of the requested information.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. For denoting a plurality of components, the suffixes "a" through "n" may be used, where n denotes any suitable integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this detailed description, for the purposes of explanation, numerous specific details are set forth to provide a thorough understanding of the described embodiments. It will be apparent to one skilled in the art, however, that other embodiments of the present invention may be practiced without some of these specific details. In other instances, certain structures and devices are shown in block diagram form. While aspects of the technology may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the detailed description does not limit the technology, but instead, the proper scope of the technology is defined by the appended claims. Examples may take the form of a hardware implementation, or an entirely software implementation, or an implementation combining software and hardware aspects. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features. The detailed description is, therefore, not to be taken in a limiting sense.

Aspects of the present invention, for example, are described above with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or the like embodiments falling within the spirit of the broader aspects of the general inventive concept embodied in this application that do not depart from the broader scope of the claimed invention.

What is claimed is:

1. A system for implementing confidence enhancement for responses by document-based artificial intelligence ("AI") and/or machine learning ("ML") models, the system comprising:
a computing system, comprising:
at least one processor; and
a computer storage medium communicatively coupled to the at least one processor, the computer storage medium storing instructions that, when executed by the at least one processor, causes the computing system to perform operations comprising:
generating a first prompt requesting information about one or more data items, based on a natural language ("NL") request that is received via a user interface;
providing the first prompt to an AI/ML-based system, the first prompt causing the AI/ML-based system to generate a structured object output including:
the requested information from the one or more data items; and
one or more citations, the one or more citations comprising one or more of a citation to each data item or a citation to each portion of each data item, from which the requested information or portions of the requested information were extracted;
generating a response to the NL request, the response comprising one or more representations of the requested information and the corresponding one or more citations;
causing, via the user interface, presentation of the generated response within a communication session between the user interface and the computing system;
generating a second prompt, the second prompt comprising the extracted information, the corresponding citations, and the one or more data items;
providing the second prompt to a second AI/ML-based system, the second prompt causing the second AI/ML-based system to:
for each citation, generate a first accuracy value corresponding to the accuracy of the citation based on the citation and the corresponding cited portion in the cited data item; and
for each of the one or more representations of the requested information, determine accuracy of said representation based on a comparison of said representation with original language in the corresponding cited portion in the cited data item based on the corresponding citation, and return a second accuracy value corresponding to the determined accuracy of said representation;
generating a reliability indicator for one or more of the citations, based on the returned first accuracy value;
causing each generated first reliability indicator to be displayed as visually coupled to the corresponding citations;
generating a second reliability indicator for each of the one or more representations of the requested information, based on the returned second accuracy value; and
causing each generated second reliability indicator to be displayed, within the structured object output, visually coupled to corresponding each of the one or more representations of the requested information.

2. The system of claim 1, wherein the computing system comprises at least one of an orchestrator, a chat interface system, a human interface system, an information access device, a server, an AI/ML system, a cloud computing system, or a distributed computing system.

3. The system of claim 1, wherein the communication session comprises one of a chat session, a voice-only session, a telephone communication session, a video communication session, a multimedia communication session, a virtual reality ("VR")-based communication session, an augmented reality ("AR")-based communication session, or a mixed reality ("MR")-based communication session, wherein the NL request comprises corresponding one of NL text request, NL voice request, or NL sign language request.

4. The system of claim 1, wherein the one or more data items comprise at least one of one or more documents, calendar events, chat messages, email messages, structured database records, or contacts.

5. The system of claim 1, wherein each citation among the one or more citations as presented in the generated response within the communication session comprises one of a text-only citation or a text citation together with a navigation link to a cited portion of the data item or a cited portion of the portion of the data item from which each corresponding requested information or each corresponding portion of the requested information was extracted.

6. The system of claim 5, wherein the one or more representations of the requested information each comprises at least one of an answer object containing the requested information, a summary of the requested information, or one or more quoted portions of at least one data item of the one or more data items containing the requested information.

7. The system of claim 6, wherein the generated response as presented within the communication session comprises the structured object output that contains one or more displayed information and the corresponding one or more citations, wherein the one or more displayed information comprise at least one of the answer object, the summary of the requested information, or the one or more quoted portions, wherein the corresponding one or more citations comprise the one of the text-only citation or the text citation together with the navigation link to the cited portion of the data item or the cited portion of the portion of the data item, wherein the structured object output is a user interface construct that is displayed within the communication session and that presents the one or more displayed information and the corresponding one or more citations, wherein the corresponding one or more citations are displayed as one or more footnotes within the structured object output.

8. The system of claim 1,
wherein the first reliability indicator and the second reliability indicator each comprises at least one of a text field containing a percentage value representing a corresponding accuracy value, a graphic field containing a graphical representation of the percentage value, or a graphic field containing color-coded graphics each corresponding to a sub-range within a spectrum of the percentage value.

9. The system of claim 1, wherein the operations further comprise:
flagging each citation, among the one or more citations, whose first accuracy values are each below a first threshold amount;
flagging each representation, among the one or more representations of the requested information, whose second accuracy values are each below a second threshold amount; and
performing at least one of the following:
repeating the generation of the structured object output, the generation of the response to the NL request, the causing of the presentation of the generated response, the generation of the second prompt, and the accuracy determinations for each flagged citation and each flagged representation;
causing the first reliability indicator for each flagged citation and the second reliability indicator for each flagged representation to be visually highlighted; or
causing warning language for each flagged citation and for each flagged representation to be displayed within the structured object output, the warning language indicating unreliability of flagged citations or representations for which the warning language is displayed.

10. A computer-implemented method for implementing confidence enhancement for responses by document-based artificial intelligence ("AI") and/or machine learning ("ML") models, the method comprising:
after receiving, via a user interface, a natural language ("NL") request to extract information from a data storage system, and in response to receiving one or more data items after at least one query has been executed to access data associated with the request, performing, by a computing system, the following operations:
generating a first prompt, based on the received one or more data items;
providing the first prompt to a first AI/ML-based system, the first prompt causing the first AI/ML-based system to return at least one AI function;
executing the at least one AI function to extract the requested information from the received one or more data items;
generating a second prompt, based on the extracted requested information;
providing the second prompt to a second AI/ML-based system, the second prompt causing the second AI/ML-based system to include one or more citations, the one or more citations comprising one or more of a citation to each data item or a citation to each portion of each data item, from which the requested information or portions of the requested information were extracted;
generating a response to the NL request, the response comprising a structured object, and one or more representations of the requested information and corresponding citation among the one or more citations being contained within the structured object;
causing, via the user interface, presentation of the structured object within a communication session between the user interface and the computing system, wherein the structured object displays the one or more representations of the requested information as at least one of an answer object containing the requested information, a summary of the requested information, or one or more quoted portions of at least one data item of the one or more data items containing the requested information, wherein the structured object displays each citation among the one or more citations as a text citation together with a navigation link to a cited portion of the data item or a cited portion of the portion of the data item from which each corresponding requested information or each corresponding portion of the requested information was extracted;
generating a third prompt, the third prompt comprising each extracted information and corresponding citation among the one or more citations, and the one or more data items; and
providing the third prompt to a third AI/ML-based system, the third prompt causing the third AI/ML-based system to:
for each citation, determine accuracy of said citation based on a comparison of said citation and corresponding cited portion in the cited data item, and return a first accuracy value corresponding to the determined accuracy of said citation; and
for each of the one or more representations of the requested information, determine accuracy of said representation based on a comparison of said representation with original language in the corresponding cited portion in the cited data item based on the corresponding citation, and return a second accuracy value corresponding to the determined accuracy of said representation
generating a first reliability indicator for each citation, based on the returned first accuracy value;
causing each generated first reliability indicator to be displayed, within the structured object, visually coupled to corresponding each citation;
generating a second reliability indicator for each of the one or more representations of the requested information, based on the returned second accuracy value; and
causing each generated second reliability indicator to be displayed, within the structured object, visually coupled to corresponding each of the one or more representations of the requested information.

11. The computer-implemented method of claim 10, wherein each citation is displayed, within the structured object, as a footnote.

12. The computer-implemented method of claim 10,
wherein the first reliability indicator and the second reliability indicator each comprises at least one of a text field containing a percentage value representing a corresponding accuracy value, a graphic field containing a graphical representation of the percentage value, or a graphic field containing color-coded graphics each corresponding to a sub-range within a spectrum of the percentage value.

13. A system for implementing confidence enhancement for responses by document-based artificial intelligence ("AI") and/or machine learning ("ML") models, the system comprising:
a computing system, comprising:
at least one processor; and
a computer storage medium communicatively coupled to the at least one processor, the computer storage medium storing instructions that, when executed by the at least one processor, causes the computing system to perform operations comprising:
after receiving, via a user interface, a natural language ("NL") request to extract information from a data storage system, and in response to receiving one or more data items after at least one query has been executed to access data associated with the request, performing the following:
generating a first prompt, based on the received one or more data items;
providing the first prompt to a first AI/ML-based system, the first prompt causing the first AI/ML-based system to return at least one function;
executing the at least one function to extract the requested information from the received one or more data items;
generating a second prompt, based on the extracted requested information;
providing the second prompt to a second AI/ML-based system, the second prompt causing the second AI/ML-based system to include one or more citations, the one or more citations comprising one or more of a citation to each data item or a citation to each portion of each data item, from which the requested information or portions of the requested information were extracted;
generating one or more representations of the requested information;
generating a third prompt, the third prompt comprising each extracted information and corresponding citation among the one or more citations, and the one or more data items;
generating a response to the NL request, the response comprising the one or more representations of the requested information, the corresponding one or more citations, a first reliability indicator for each citation, and a second reliability indicator for each of the one or more representations of the requested information; and
causing, via the user interface, presentation of the generated response within a communication session between the user and the computing system, the generated response as presented within the communication session displaying each generated first reliability indicator visually coupled to corresponding each citation and displaying each generated second reliability indicator visually coupled to corresponding each of the one or more representations of the requested information.

14. The system of claim 13, wherein each citation is displayed, within the structured object output, as a footnote.

15. The system of claim 13, wherein the operations further comprise:
providing the third prompt to a third AI/ML-based system, the third prompt causing the third AI/ML-based system to:
for each citation,
determine a first accuracy value corresponding to accuracy of said citation based on a comparison of said citation and corresponding cited portion in the cited data item;
generate the first reliability indicator for said citation, based on the first accuracy value for said citation; and
return the first reliability indicator for said citation;
for each representation of the one or more representations of the requested information,
determine a second accuracy value corresponding to accuracy of said representation based on a comparison of said representation with original language in the corresponding cited portion in the cited data item based on the corresponding citation;
generate the second reliability indicator for said representation, based on the second accuracy value for said representation; and
return the second reliability indicator for said representation.

16. The system of claim 13, wherein the first reliability indicator and the second reliability indicator each comprises at least one of a text field containing a percentage value representing a corresponding accuracy value, a graphic field containing a graphical representation of the percentage value, or a graphic field containing color-coded graphics each corresponding to a sub-range within a spectrum of the percentage value.

17. The system of claim 13, wherein the operations further comprise:
flagging each citation, among the one or more citations, whose first accuracy values are each below a first threshold amount;
flagging each representation, among the one or more representations of the requested information, whose second accuracy values are each below a second threshold amount; and
performing at least one of the following:
repeating the generation of the response to the NL request, the causing of the presentation of the generated response, the generation of the second prompt, and the accuracy determinations for each flagged citation and each flagged representation;
causing the first reliability indicator for each flagged citation and the second reliability indicator for each flagged representation to be visually highlighted; or
causing warning language for each flagged citation and for each flagged representation to be displayed within the structured object output, the warning language indicating unreliability of flagged citations or representations for which the warning language is displayed.

18. The system of claim 13, wherein the generated response as presented within the communication session comprises a structured object that contains at least one of the one or more representations of the requested information, the corresponding one or more citations, the first reliability indicator for each citation, or the second reliability indicator for each of the one or more representations of the requested information.

19. The system of claim 13, wherein the one or more data items comprise at least one of one or more documents, calendar events, chat messages, email messages, structured database records, or contacts.

20. The system of claim 13, wherein the first reliability indicator comprises at least a text field containing a percentage value representing a corresponding accuracy value.

\* \* \* \* \*